United States Patent
Wulf et al.

(10) Patent No.: US 7,140,666 B2
(45) Date of Patent: Nov. 28, 2006

(54) LATCH FOR AN AUTOMOBILE VEHICLE HAVING A CONVERTIBLE ROOF

(75) Inventors: Markus Wulf, Commerce Township, Oakland County, MI (US); Gary J. Forgue, Northville, MI (US); Stefan Eichhorst, West Bloomfield, MI (US); Jens Loemker, West Bloomfield, MI (US)

(73) Assignees: ASC Incorporated, Southgate, MI (US); Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/638,948

(22) Filed: Aug. 11, 2003

(65) Prior Publication Data

US 2004/0119317 A1 Jun. 24, 2004

Related U.S. Application Data

(60) Provisional application No. 60/403,716, filed on Aug. 15, 2002.

(51) Int. Cl.
*B60J 7/00* (2006.01)

(52) U.S. Cl. .................. 296/124; 296/107.08; 296/108; 292/DIG. 5

(58) Field of Classification Search ........... 296/107.16, 296/107.17, 108, 121, 124, 128, 132, 136.05, 296/136.06, 107.08; 292/DIG. 5
See application file for complete search history.

(56) References Cited

U.S. PATENT DOCUMENTS

| | | | |
|---|---|---|---|
| 4,854,634 A | 8/1989 | Shiraishi et al. | |
| 4,979,384 A | 12/1990 | Malesko et al. | |
| 5,186,516 A | 2/1993 | Alexander et al. | |
| 5,225,747 A | 7/1993 | Helms et al. | |
| 5,267,769 A | 12/1993 | Bonne et al. | |
| 5,445,326 A | 8/1995 | Ferro et al. | |
| 5,451,849 A | 9/1995 | Porter et al. | |
| 5,620,226 A | 4/1997 | Sautter, Jr. | |
| 5,678,881 A | 10/1997 | Tokarz | |
| 5,711,559 A | 1/1998 | Davis | |
| 5,743,587 A | 4/1998 | Alexander et al. | |
| 5,772,274 A * | 6/1998 | Tokarz | 296/107.09 |
| 5,825,147 A | 10/1998 | Porter et al. | |
| 5,904,394 A | 5/1999 | Dilluvio et al. | |
| 5,998,948 A * | 12/1999 | Lange et al. | |
| 6,053,560 A | 4/2000 | Rothe | |
| 6,114,819 A | 9/2000 | Porter et al. | |
| 6,131,988 A | 10/2000 | Queveau et al. | |
| 6,145,915 A | 11/2000 | Queveau et al. | |
| 6,246,199 B1 | 6/2001 | Porter et al. | |
| 6,254,165 B1 | 7/2001 | Neubrand | |
| 6,288,511 B1 | 9/2001 | Porter et al. | |
| 6,290,281 B1 | 9/2001 | Durrani et al. | |
| 6,299,233 B1 | 10/2001 | Mentink | |
| 6,315,349 B1 | 11/2001 | Kinnanen | |

(Continued)

OTHER PUBLICATIONS

European Search Report for EP 03 26 5026, dated Jun. 6, 2005, 4 pages.

(Continued)

*Primary Examiner*—Stephen Gordon
(74) *Attorney, Agent, or Firm*—Harness, Dickey & Pierce, P.L.C.

(57) ABSTRACT

A latching system for an automotive vehicle having a convertible roof is provided. In another aspect of the present invention, front and/or rear convertible roof sections are rigid, hard-top roofs. A further aspect of the present invention system provides a latch which secures a generally rigid tonneau cover.

33 Claims, 25 Drawing Sheets

U.S. PATENT DOCUMENTS

| | | |
|---|---|---|
| 6,318,792 B1 | 11/2001 | Neubrand et al. |
| 6,318,793 B1 | 11/2001 | Rapin et al. |
| 6,347,828 B1 | 2/2002 | Rapin et al. |
| 6,390,529 B1 | 5/2002 | Bingle et al. |
| 6,390,532 B1 | 5/2002 | Mac Farland |
| 6,497,447 B1 | 12/2002 | Willard |
| 6,508,502 B1 | 1/2003 | Willard |
| 6,581,989 B1 | 6/2003 | Markisello |
| 2003/0034667 A1 | 2/2003 | Willard |
| 2003/0034668 A1 | 2/2003 | Quindt |
| 2003/0080581 A1 | 5/2003 | Quindt |

OTHER PUBLICATIONS

Edscha AG Jan. 2003 "Edwin" brochure, pp. 10 and 11, showing BMW Z4 convertible roof topstack mechanism (offered for sale before Aug. 2002).

* cited by examiner

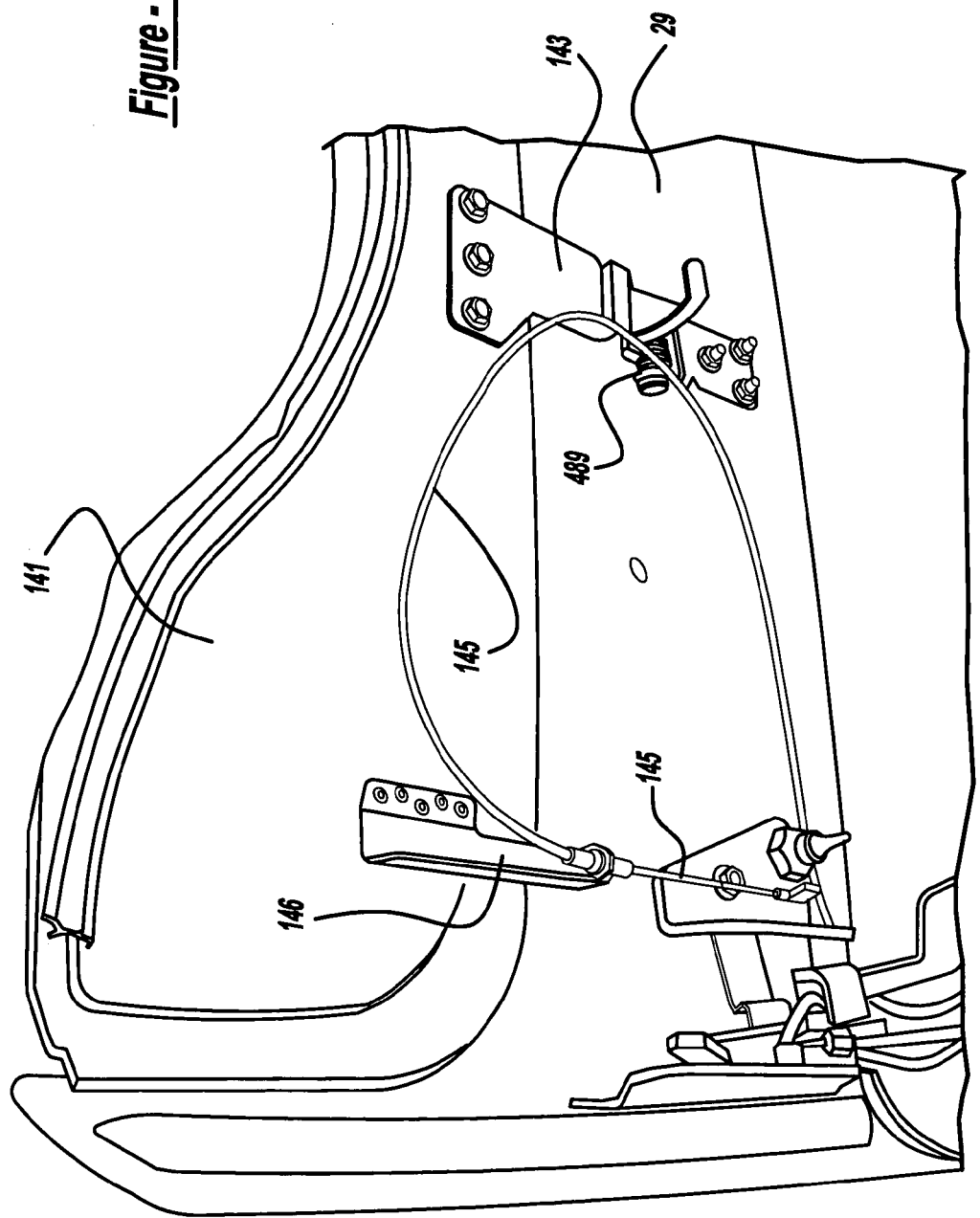

LATCH FOR AN AUTOMOBILE VEHICLE HAVING A CONVERTIBLE ROOF

CROSS REFERENCE TO RELATED APPLICATIONS

This application claims priority to Provisional Application U.S. Ser. No. 60/403,716, filed Aug. 15, 2002.

BACKGROUND AND SUMMARY OF THE INVENTION

This invention relates generally to automotive roof systems and more particularly to a latch for an automotive vehicle having a convertible roof.

Rigid hard-top convertible roofs have been used on a variety of automotive vehicles. Some of these conventional convertible hard-top roofs are stored in a generally vertical orientation and some are stored in a predominantly horizontal orientation. Furthermore, some of these conventional hard-top roofs fold in a clamshelling manner while others are collapsible in an overlapping manner. Examples of traditional hard-top convertible roofs are disclosed in the following patents: U.S. Pat. No. 6,347,828 entitled "Actuation Mechanism for a Two Piece Retractable Hard-Top Roof for an Automobile" which issued to Rapin et al. on Feb. 19, 2002; U.S. Pat. No. 6,318,793 entitled "Two Piece Retractable Hard-Top Roof for an Automobile" which issued to Rapin et al. on Nov. 20, 2001; U.S. Pat. No. 5,979,970 entitled "Roof Assembly for a Convertible Vehicle" which issued to Rothe et al. on Nov. 9, 1999; U.S. Pat. No. 5,785,375 entitled "Retractable Hard-Top for an Automotive Vehicle" which issued to Alexander et al. on Jul. 28, 1998; U.S. Pat. No. 5,769,483 entitled "Convertible Motor Vehicle Roof" which issued to Danzl et al. on Jun. 23, 1998; U.S. Pat. No. 5,743,587 entitled "Apparatus for Use in an Automotive Vehicle having a Convertible Roof System" which issued to Alexander et al. on Apr. 28, 1998; and EPO Patent Publication No. 1 092 580 A1 which was published on Apr. 18, 2001. The U.S. patents are incorporated by reference herein.

Various tonneau cover latches are disclosed in U.S. Pat. No. 5,678,881 entitled "Apparatus and Method for Securing a Convertible Roof to an Automotive Vehicle" which issued to Tokarz on Oct. 21, 1997; and U.S. Pat. No. 5,267,769 entitled "Manually Operable Folding Top for Vehicles using Automatic-Ejection Snap-Action Closures" which issued to Bonne et al. on Dec. 7, 1993; both of which are incorporated by reference herein. While the Tokarz latches are significant improvements in the industry, many known devices may not necessarily be well suited for use in extremely difficult to package areas along the quarter panel of a vehicle. Furthermore, the tonneau cover and convertible roof may be locked into lowered positions if the electrical power is not working with most, if not all, prior automatically powered latching devices.

In accordance with the present invention, a latching system for an automotive vehicle having a convertible roof is provided. In another aspect of the present invention, front and/or rear convertible roof sections are rigid, hard-top roofs. A further aspect of the present invention provides that the outside surfaces of retractable roofs have a generally vertical orientation when in their open and retracted positions. In yet another aspect of the present invention, a latch secures a generally rigid tonneau cover. A latch is extremely thin in cross-car size for packaging adjacent a quarter panel of a vehicle, in still another aspect of the present invention. A further aspect of the present invention provides a manual override for an automatically powered latch. Another aspect of the present invention uses a rigid tonneau cover, a tonneau cover linkage mechanism, a movable closeout panel, and a cable drive, which serve to cover a roof storage space and the roof storage space does not obstruct a trunk or storage bed area of a vehicle. In a further aspect of the present invention, a method of using a latch is also provided.

The latching system of the present invention is advantageous over conventional systems in that the present invention minimizes the stored roof packaging area by tightly collapsing one roof section relative to the other. The present invention convertible roof system is also advantageous since it can be retracted with minimal, if any, intrusion in the passenger compartment area of the vehicle while also storing the roof forward of a user accessible storage area, such as a trunk or pickup truck bed. The latch of the present invention is advantageous over prior devices by having an extremely thin cross-car size which is packaged in a very tight quarter panel area. Moreover, another significant advantage is the ability to manually override the automatic actuator in order to release or latch the tonneau cover in the event of a power failure. Additional advantages and features of the present invention will become apparent from the following description and appended claims, taken in conjunction with the accompanying drawings.

BRIEF DESCRIPTION OF THE DRAWINGS

FIG. 26 is a front perspective view, like FIG. 19, showing a cable used with the tonneau cover and closeout panel employed in the alternate embodiment system.

DETAILED DESCRIPTION OF THE PREFERRED EMBODIMENT

Figure 1:
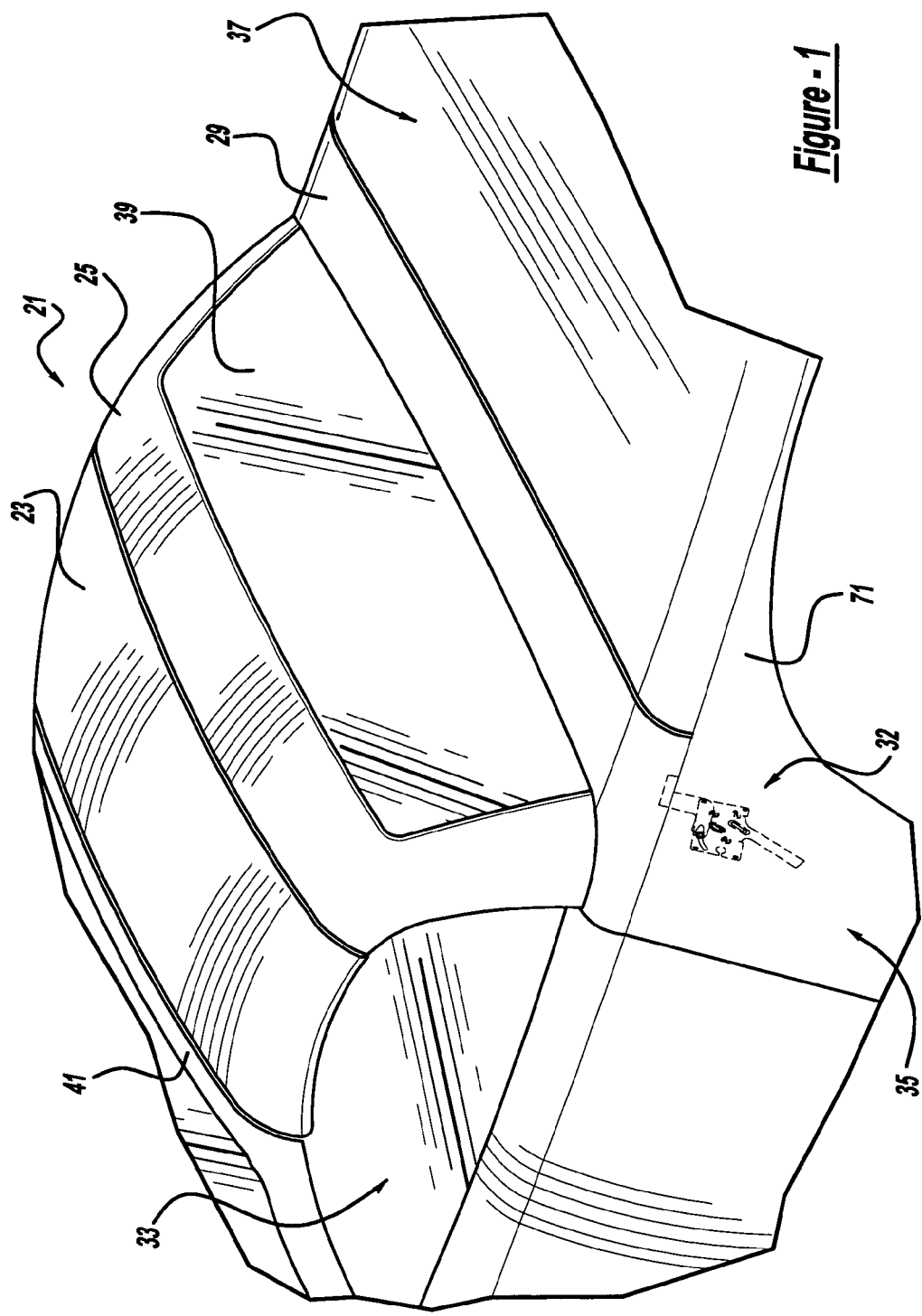
FIG. 1 is a fragmentary, perspective view, as observed from the rear left corner of the vehicle, showing the preferred embodiment of a latch and convertible roof system of the present invention disposed in a fully closed and raised position.
Figure 2:
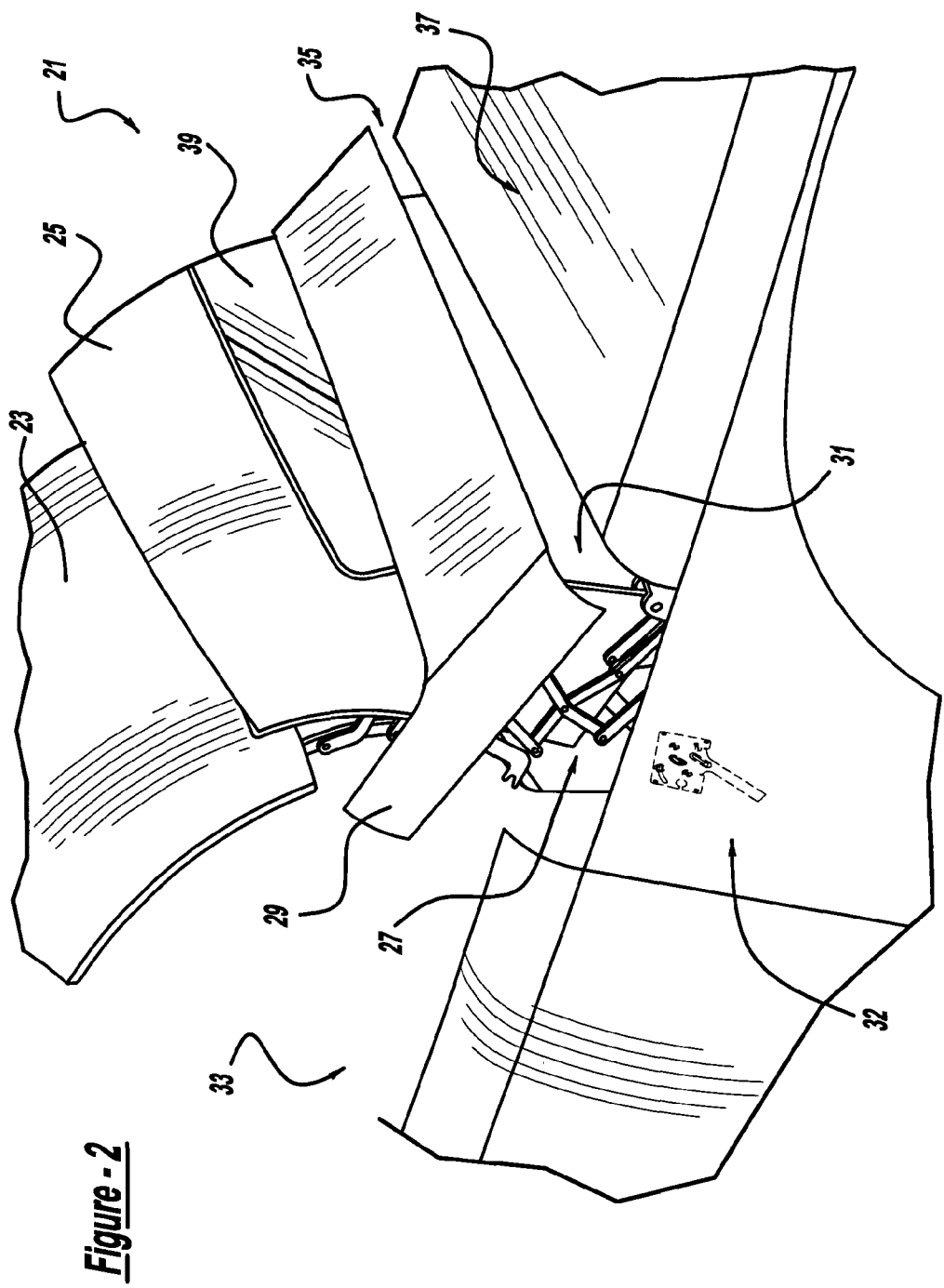
FIG. 2 is a fragmentary and perspective view, like that of FIG. 1, showing the preferred embodiment system disposed in a partially retracted position.
Figure 3:
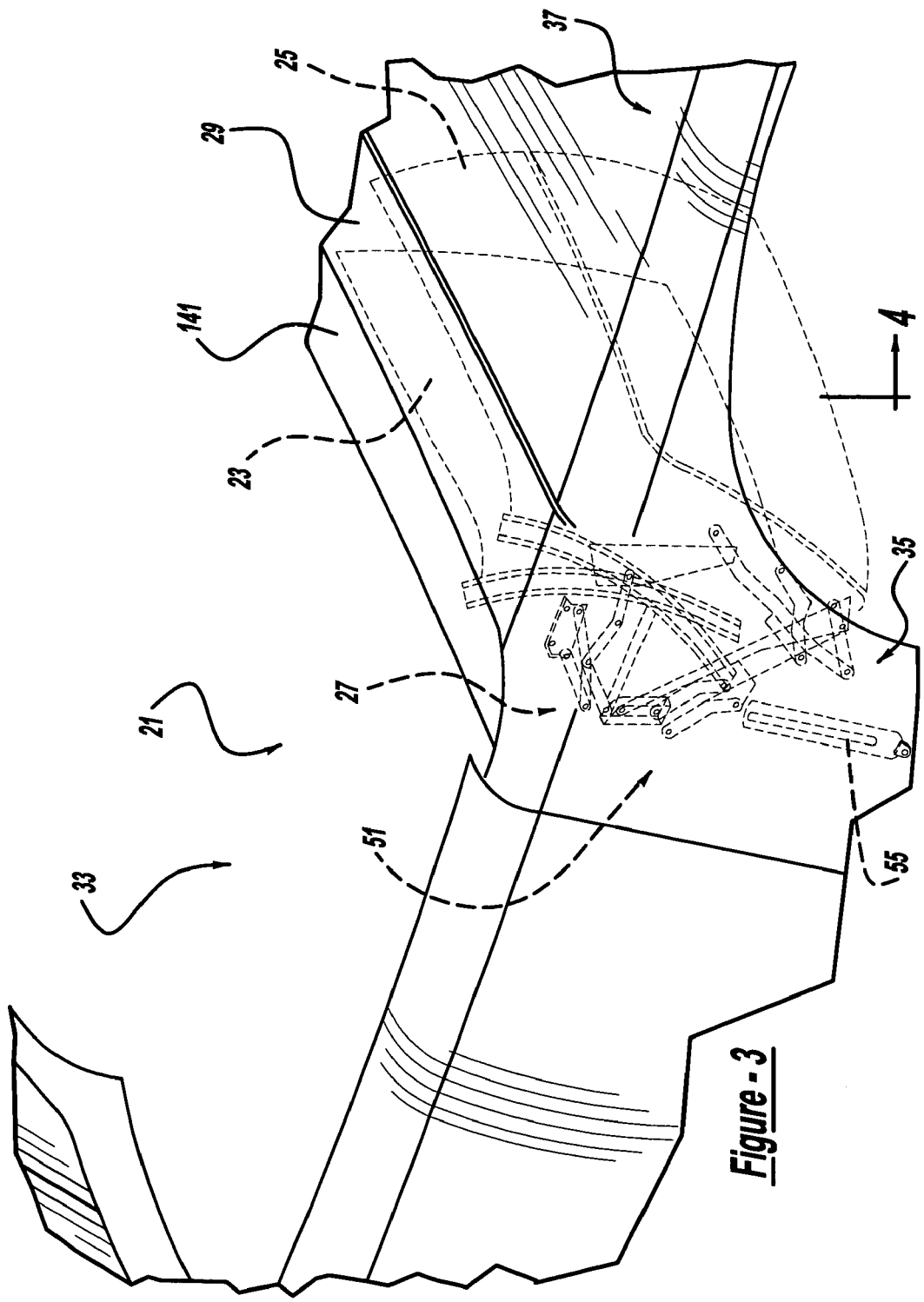
FIG. 3 is a fragmentary and perspective view, like that of FIG. 1, showing the preferred embodiment system disposed in a fully open and retracted position.
Figure 4:
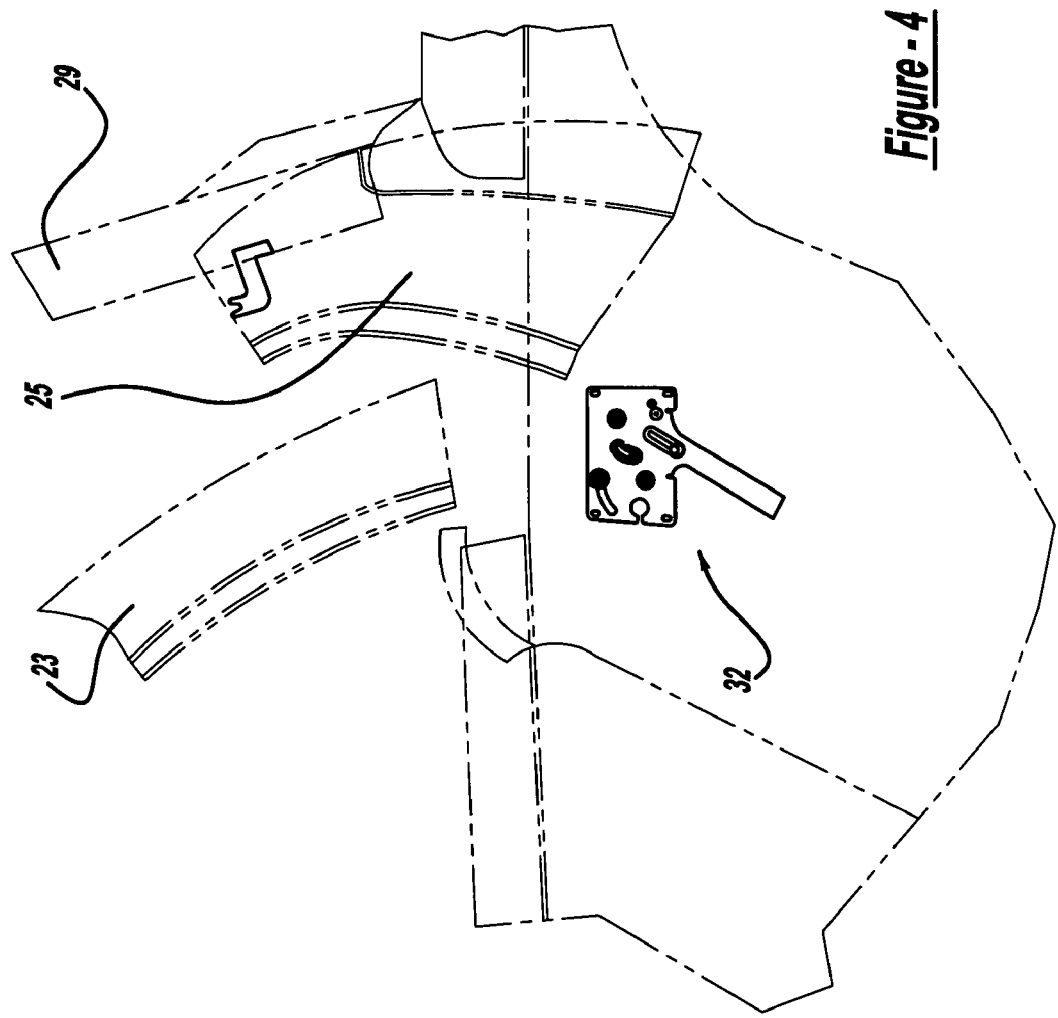
FIG. 4 is a side diagrammatic view showing the preferred embodiment system, disposed in the partially retracted position.
Figure 5:
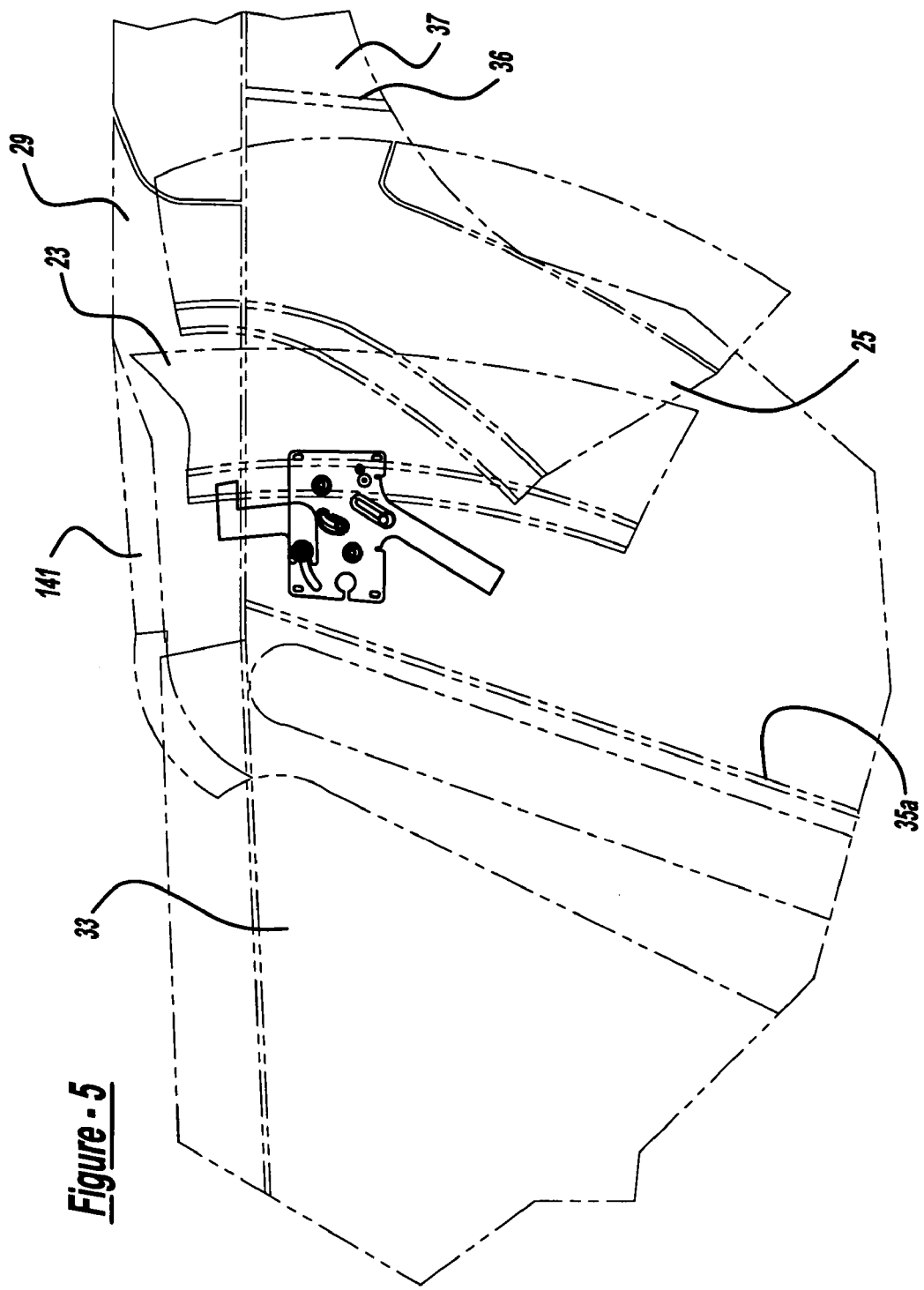
FIG. 5 is a side diagrammatic view showing the preferred embodiment system, disposed in the fully retracted position.
Figure 6:
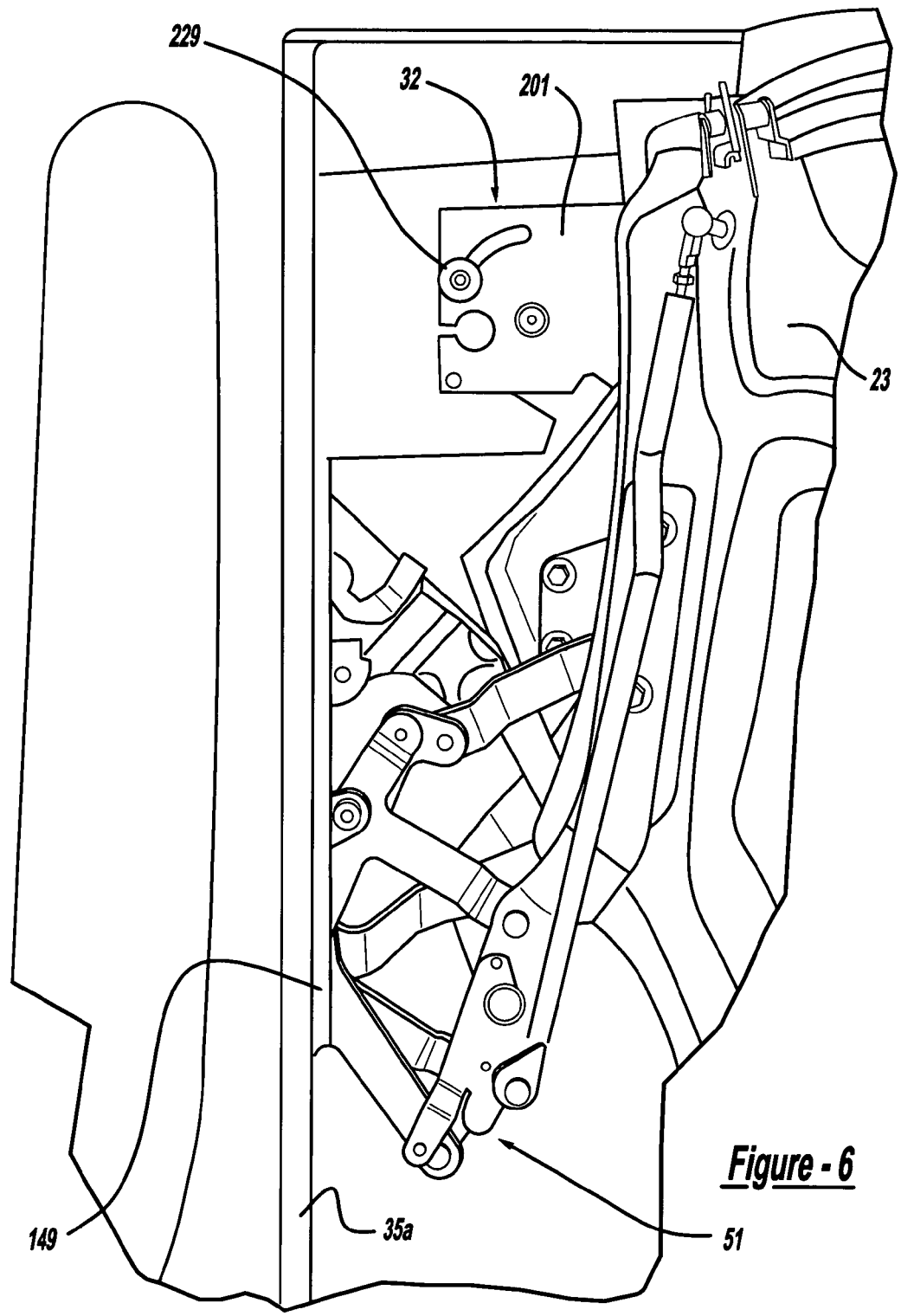
FIG. 6 is a centerline cross sectional view, taken along line 6—6 of FIG. 3, showing the preferred embodiment system.

Referring to FIGS. 1–6, a convertible roof system 21 is part of an automotive vehicle and includes a hard-top front roof 23, a hard-top rear roof 25, a top stack mechanism 27 operable to move the roofs, a rigid tonneau cover 29, a tonneau cover mechanism 31 and a tonneau latching system 32. Roofs 23 and 25 are automatically movable from fully raised and closed positions covering a passenger compartment 33, as shown in FIG. 1, to fully retracted and open positions, as shown in FIGS. 3, 5 and 6, wherein roofs 23 and 25 are stowed in a roof storage area or compartment 35. Roof storage compartment 35 is located between a metal, seat back panel or bulkhead 35a and a metal rear panel 36. Bulkhead 35a separates roof storage compartment 35 from passenger compartment 33 and rear panel 36 separates roof storage compartment 35 from an externally accessible storage area for miscellaneous articles such as a trunk or pickup truck bed 37. A rigid, glass back window or backlite 39 is secured to rear roof 25 while front roof 23 is disengagably attached to a front header panel 41 by latches. Weatherstrips or seals are also employed around the peripheral edges of roofs 23 and 25. Roofs 23 and 25 are preferably stamped from steel sheets and include inner reinforcement panels, but the roofs may alternately be formed from polymeric composites or aluminum. Roofs 23 and 25 have opaque outside surfaces 43 that are typically painted. These outside surfaces 43 define three-dimensionally curved planes which are stored in a predominantly vertical and parallel nested orientation when fully retracted and stowed; this can be observed best in FIG. 5.

Figure 21:
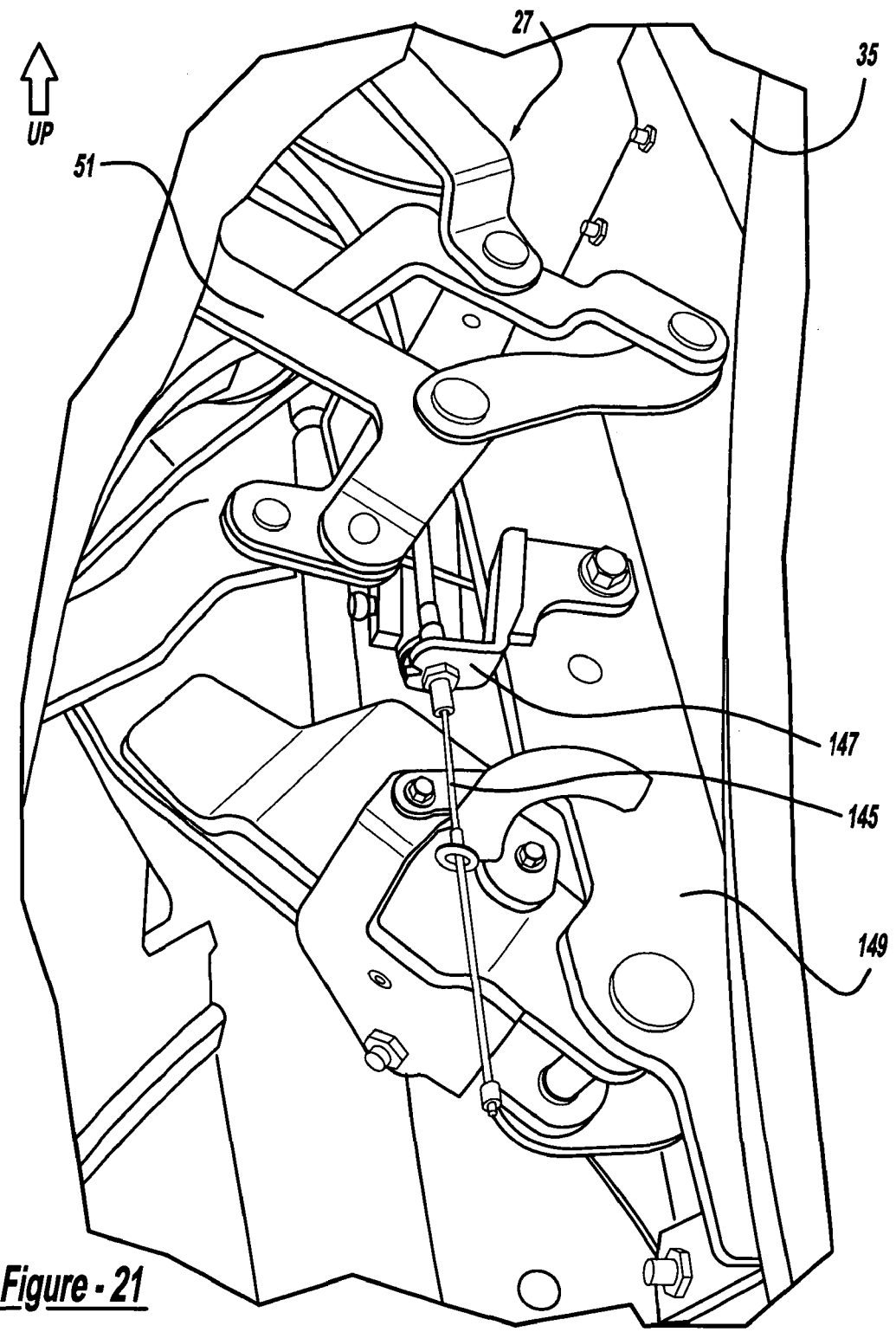
FIG. 21 is a perspective view showing a stationary bracket and a cable employed in an alternate embodiment.
Figure 22:
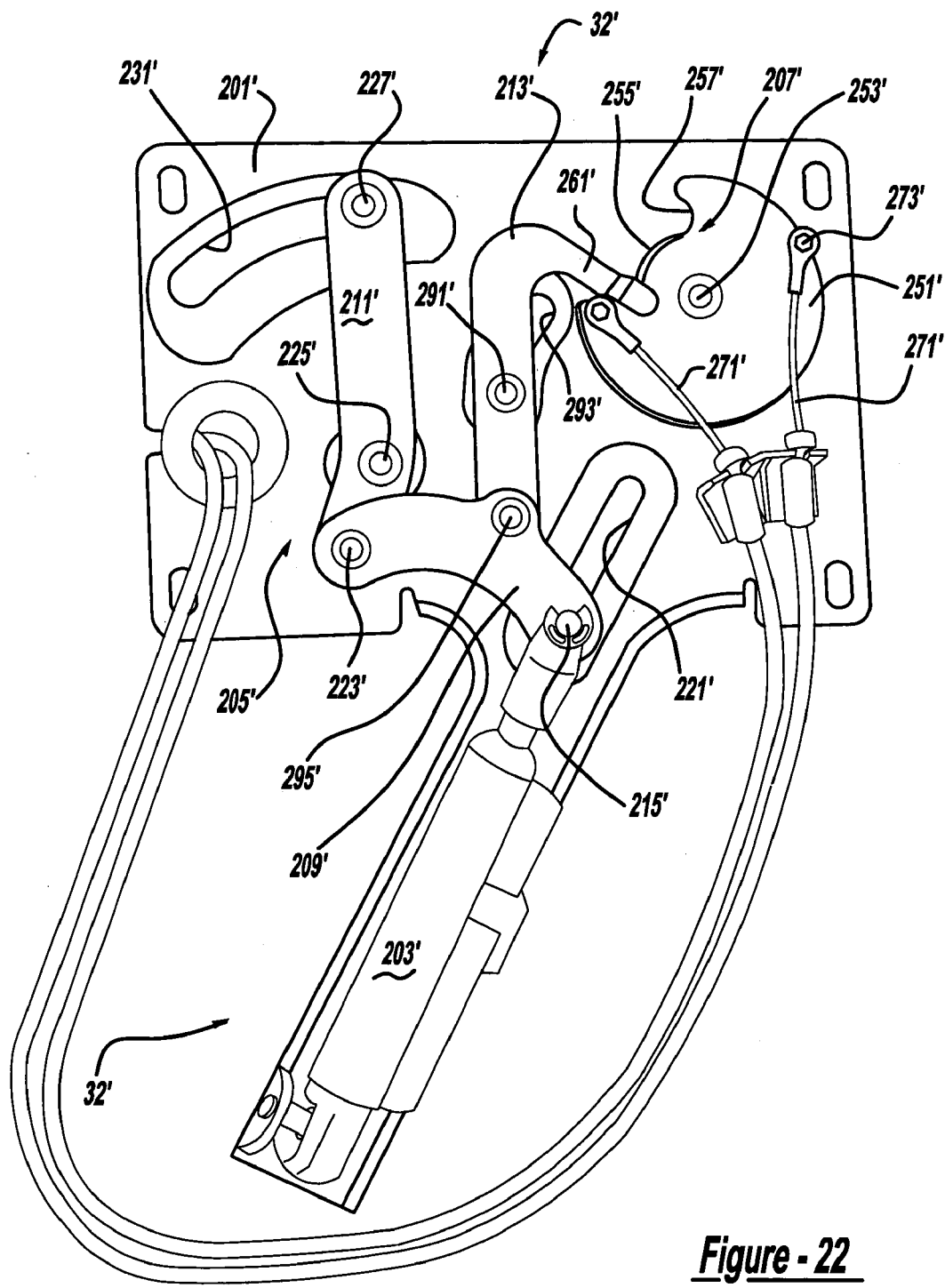
FIG. 22 is a side elevational view, like that of FIG. 12, showing the latch assembly employed in the alternate embodiment system, disposed in an unlatched position.

Top stack mechanism 27 is in mirrored symmetry in both outboard sides of the vehicle and will only be described for the left-hand side with reference to FIGS. 3, 6 and 21. Top stack mechanism 27 includes a linkage assembly 51 and a hydraulic actuator 55. Linkage assembly 51 is preferably constructed in accordance with German patent application serial number 101 39 354.7 entitled "Cabriolet-Fahrzeug" (Vehicle) which was filed on Aug. 17, 2001, which is incorporated by reference herein. Roofs 23 and 25 can be tightly and closely nested together when fully retracted and the centerline, fore-and-aft roof storage area opening can be minimized due to linkage assembly 51.

Tonneau cover mechanism 31 and tonneau cover 29 are best shown in FIGS. 7–10 and 19; only one side will be discussed since the other is in mirrored symmetry. Tonneau cover mechanism 31 includes a linkage assembly 103 having a pair of arcuate gooseneck links 105 and 107, a first straight link 109 and a second straight link 111. Proximal ends of gooseneck links 105 and 107 are pivotably mounted to a vehicle body-mounted bracket (see FIG. 10). Straight links 109 and 111 are coupled at a pivot 113. A hydraulic actuator 115 (see FIG. 10) is coupled to and drives gooseneck link 105. Accordingly, when hydraulic actuator 115 is energized, tonneau cover mechanism 31 will cause tonneau cover 29 to rearwardly pivot from the closed position of FIG. 1 to the open position of FIG. 4. This allows roofs 23 and 25 to enter roof storage area 35. Tonneau cover 29 will be automatically returned to its closed position in order to cover and externally hide the stowed roofs.

Figure 7:
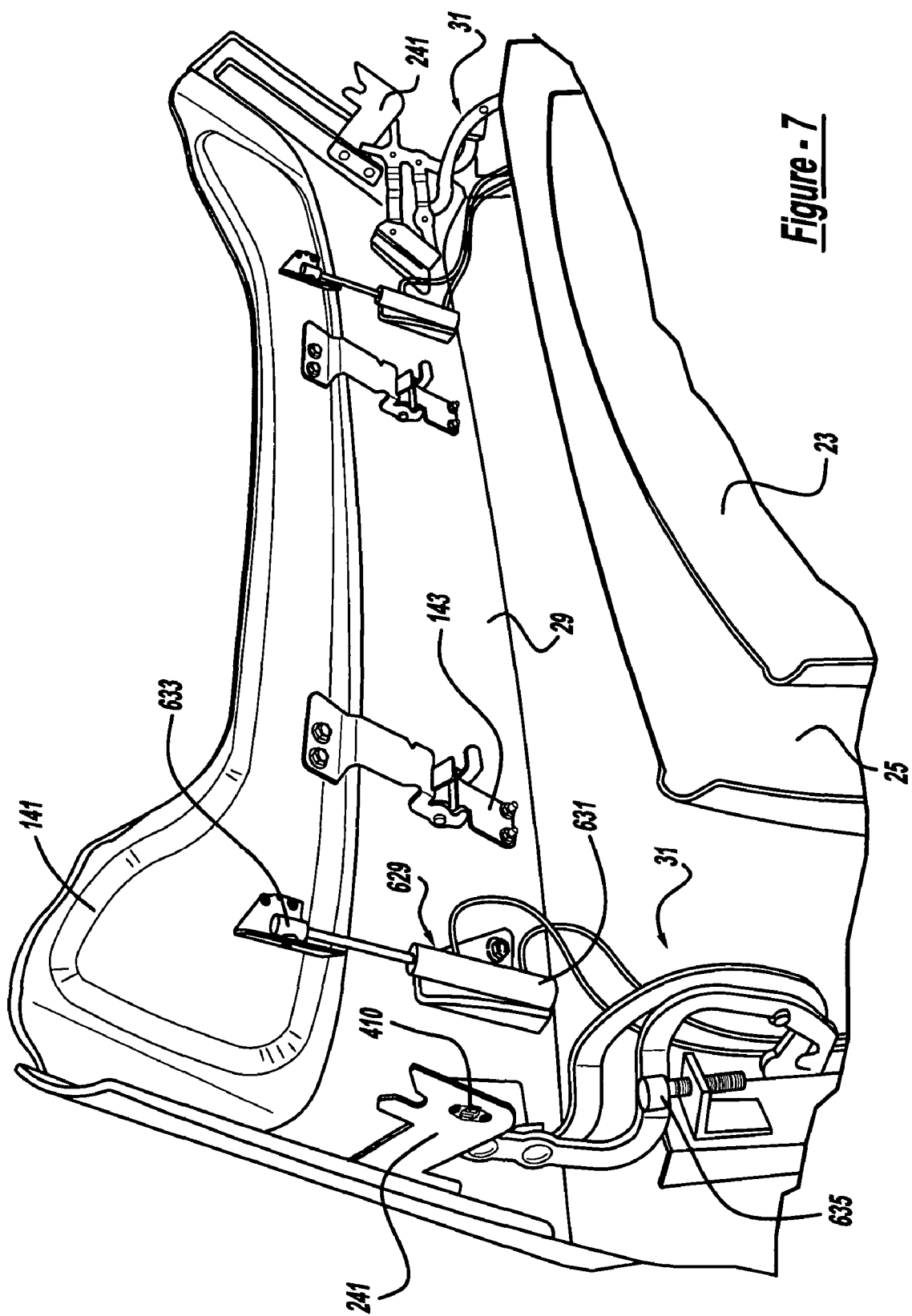
FIG. 7 is a front perspective view showing a tonneau cover mechanism employed in the preferred embodiment system, disposed in a partially open position.
Figure 8:
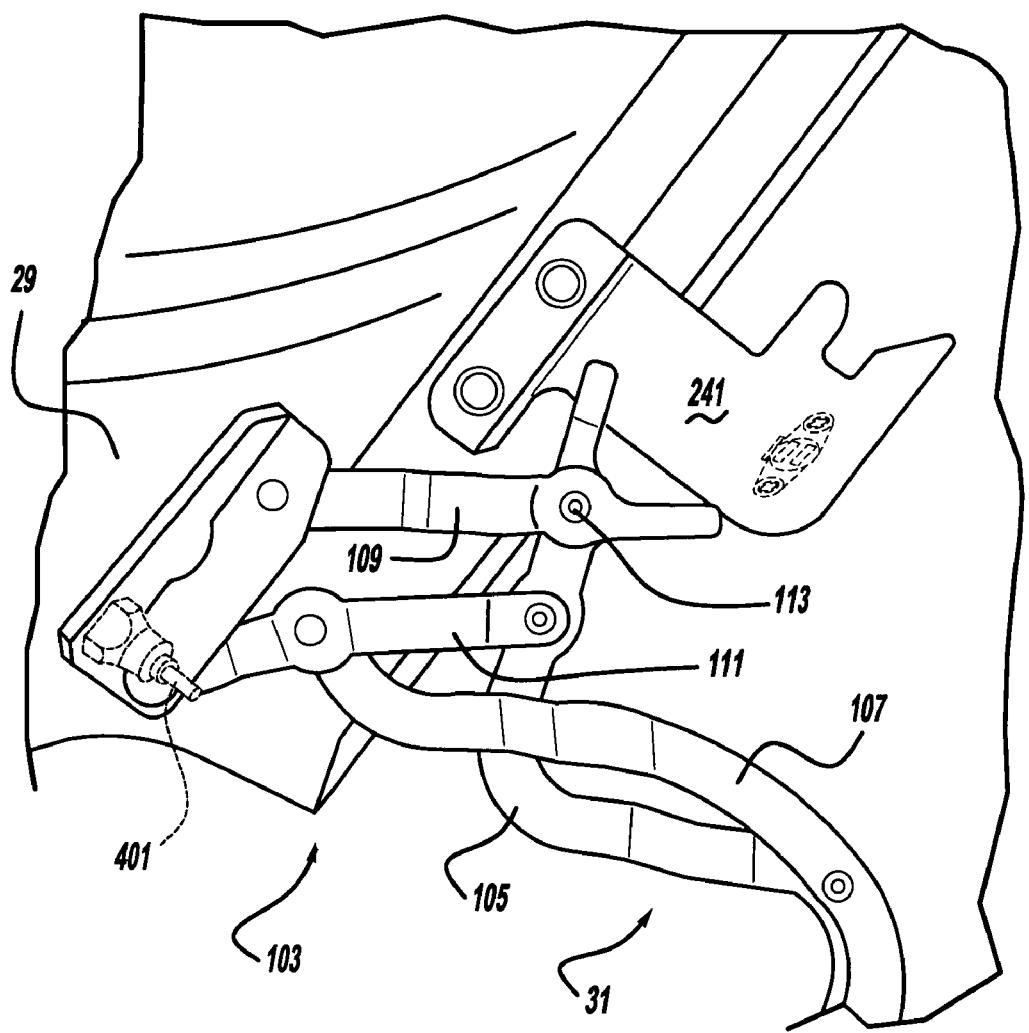
FIG. 8 is an enlarged, side elevational view showing the tonneau cover mechanism employed in the preferred embodiment system, disposed in the partially open position.
Figure 9:
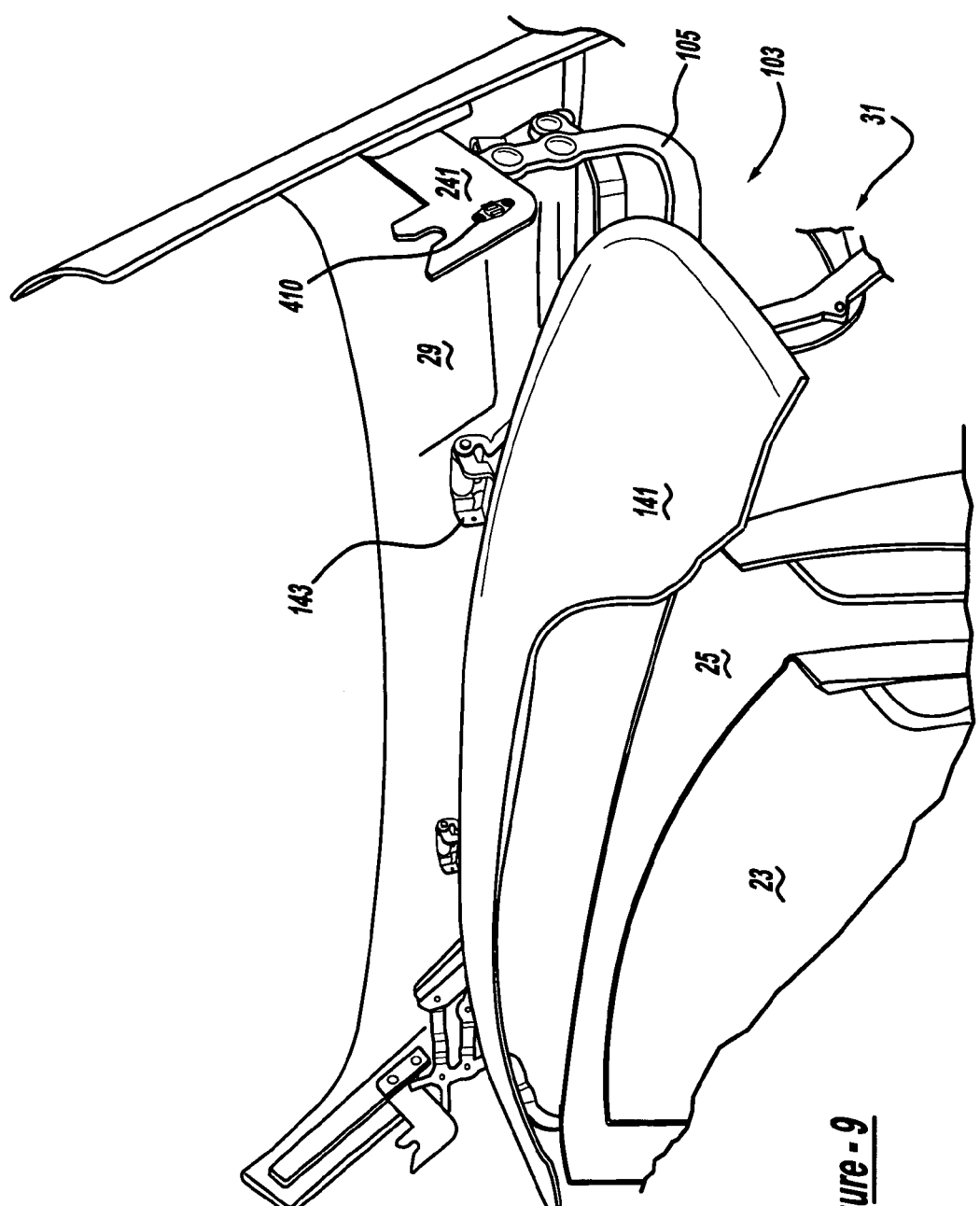
FIG. 9 is a front perspective view showing the tonneau cover mechanism employed in the preferred embodiment system, disposed in the partially open position and a closeout panel shown in a retracted position.
Figure 10:
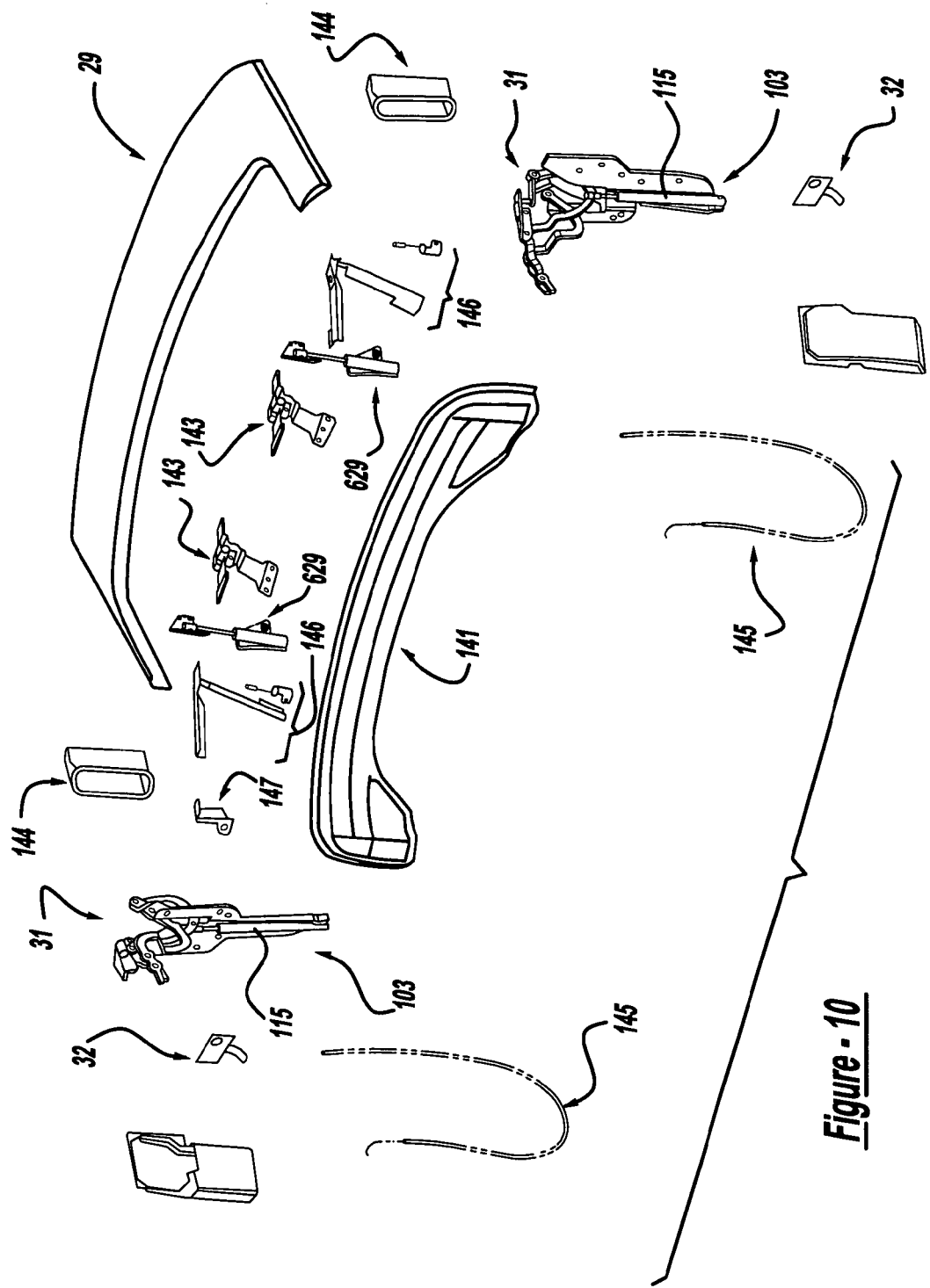
FIG. 10 is an exploded perspective view showing the tonneau cover mechanism employed in the preferred embodiment system.
Figure 19:
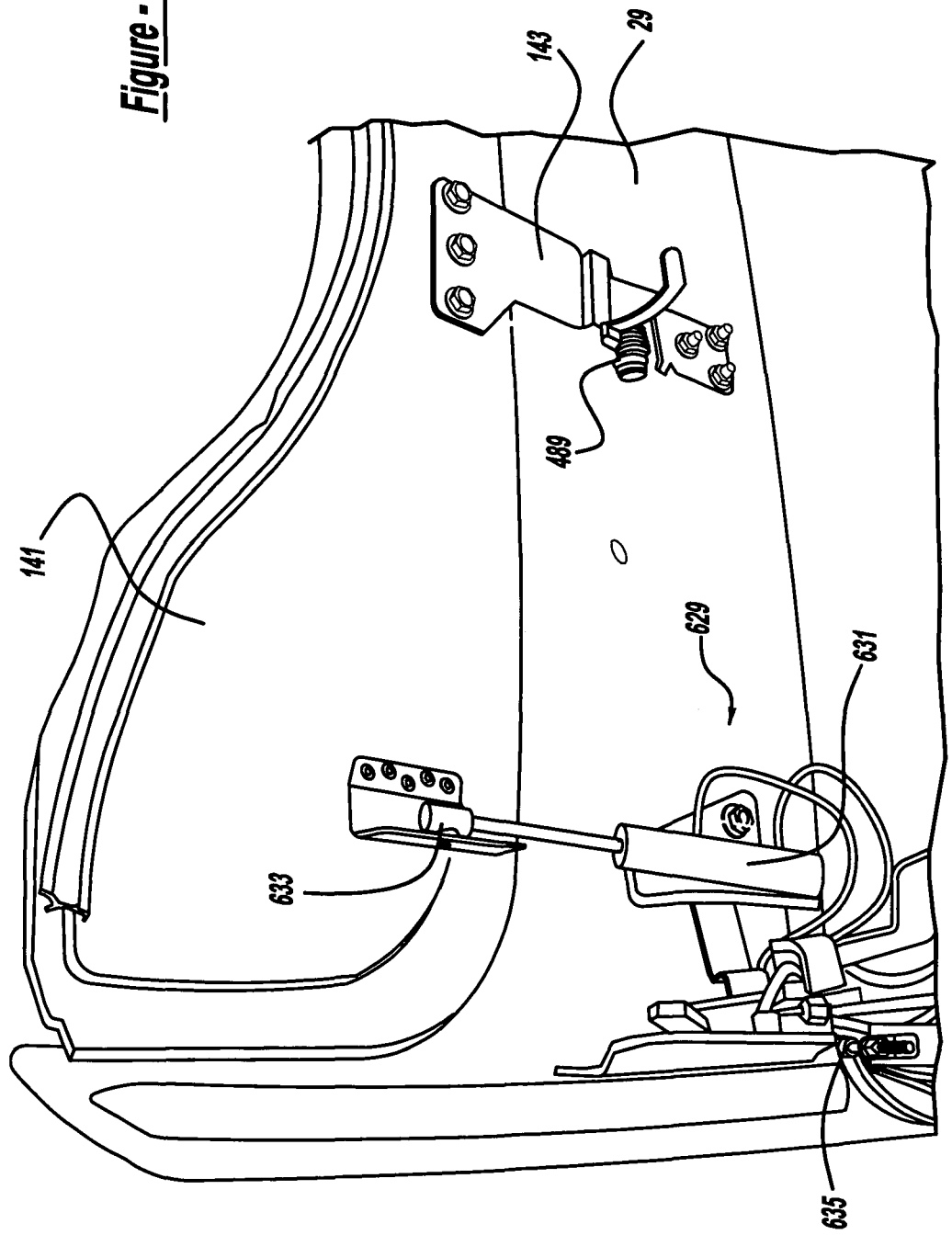
FIG. 19 is a front perspective view showing an actuator used with the tonneau cover and closeout panel employed in the preferred embodiment system.

A rigid flipper door or closeout panel 141 is attached to a front section of tonneau cover 29 by a pair of hinges 143. For each hinge 143, a first plate is secured to a bottom surface of tonneau cover 29 and a second plate is secured to a bottom surface of closeout panel 141. If necessary, the plates are coupled at a pivot pin with a torsion spring 489 (best observed in FIG. 19) biasing the plates into a co-planar extended orientation (as shown in FIGS. 3, 7 and 19). An aesthetic trim panel 144 (see FIG. 10) covers a portion of each tonneau cover mechanism 31 and a latch trim panel covers a portion of each latch assembly. Preferably, a pair of automatic, hydraulic fluid actuators 629 each have a first, linearly extendable rod end 633 coupled to a bracket mounted to closeout panel 141. A fluid cylinder end 631 of each fluid actuator 629 is mounted to a tonneau cover bracket. Thus, actuation of fluid actuators 629 rotate closeout panel 141 relative to tonneau cover 29. Adjustable bumpers 635 assist in locating tonneau cover 29 in its closed position. In an alternate embodiment, shown in FIGS. 21 and 26, a first end of a cable actuator 145, which slides within a protective sheath, is connected to and operably drives a corresponding lever/bracket 146 mounted to closeout panel 141. The opposite end of each cable 145 is secured to a fixed cable bracket 147 stationarily mounted to a main bracket 149 supporting roof linkage assembly 51, which in turn, is fastened to bulkhead 35a.

Figure 11:
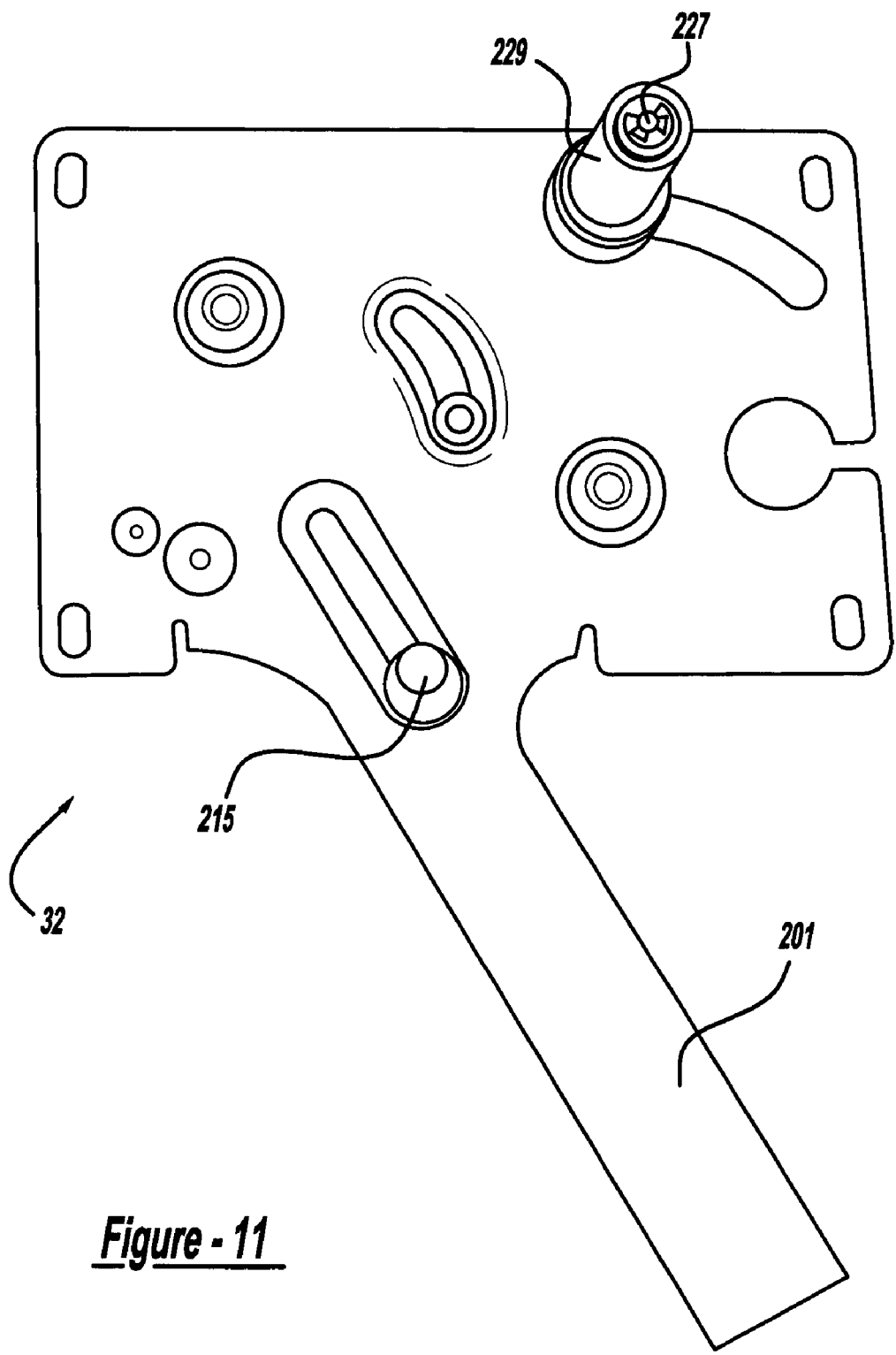
FIG. 11 is a side elevational view showing a latch assembly employed in the preferred embodiment system, disposed in an unlatched position.
Figure 12:
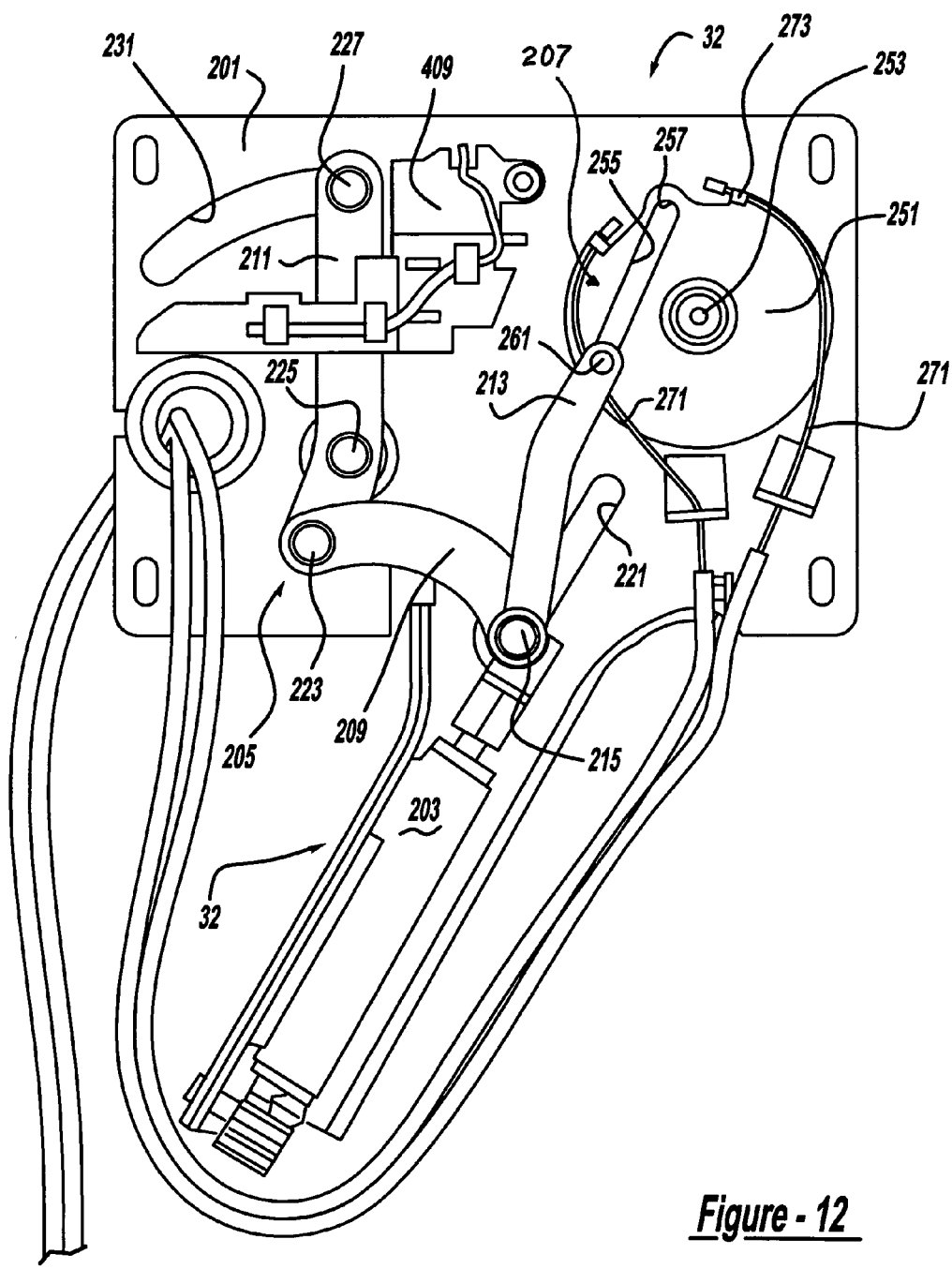
FIG. 12 is a side elevational view, opposite that of FIG. 11, showing the latch assembly employed in the preferred embodiment system, disposed in the unlatched position.
Figure 13:
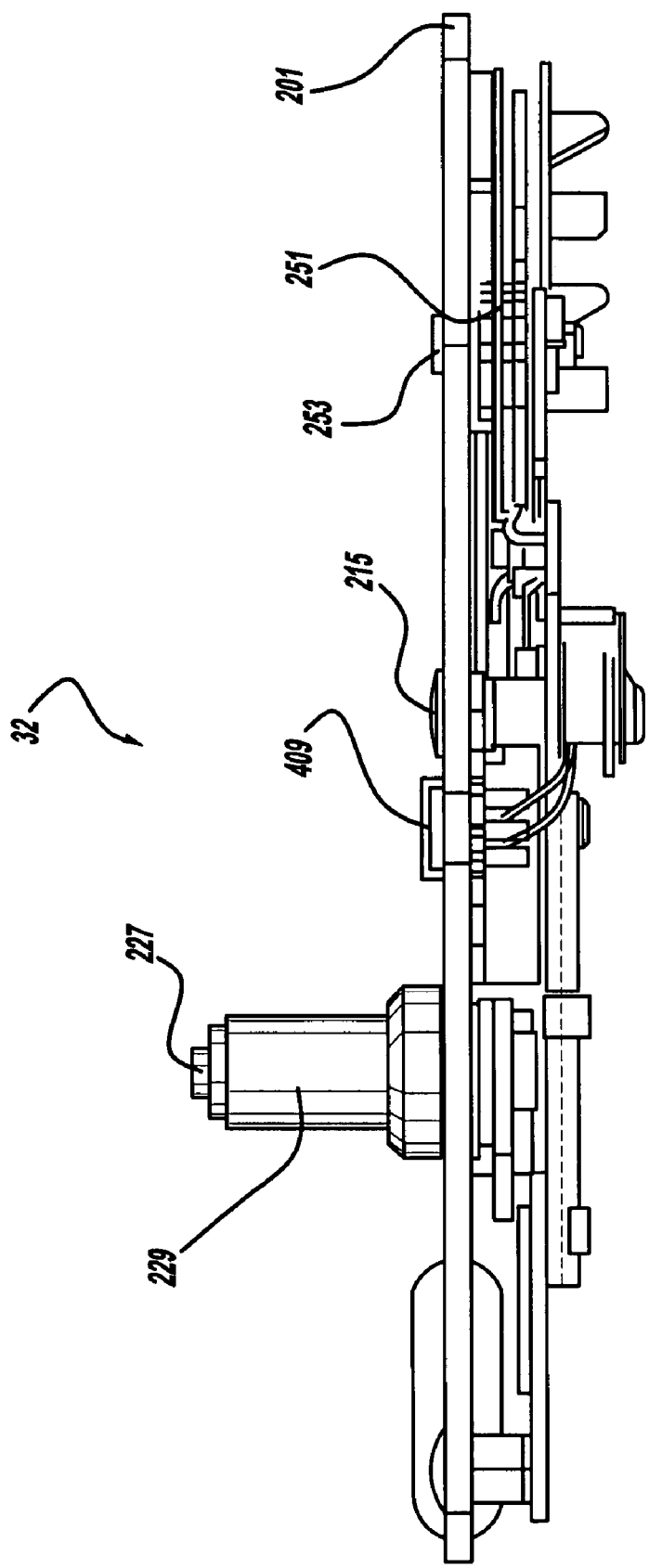
FIG. 13 is a top elevational view showing the latch assembly employed in the preferred embodiment system.
Figure 14:
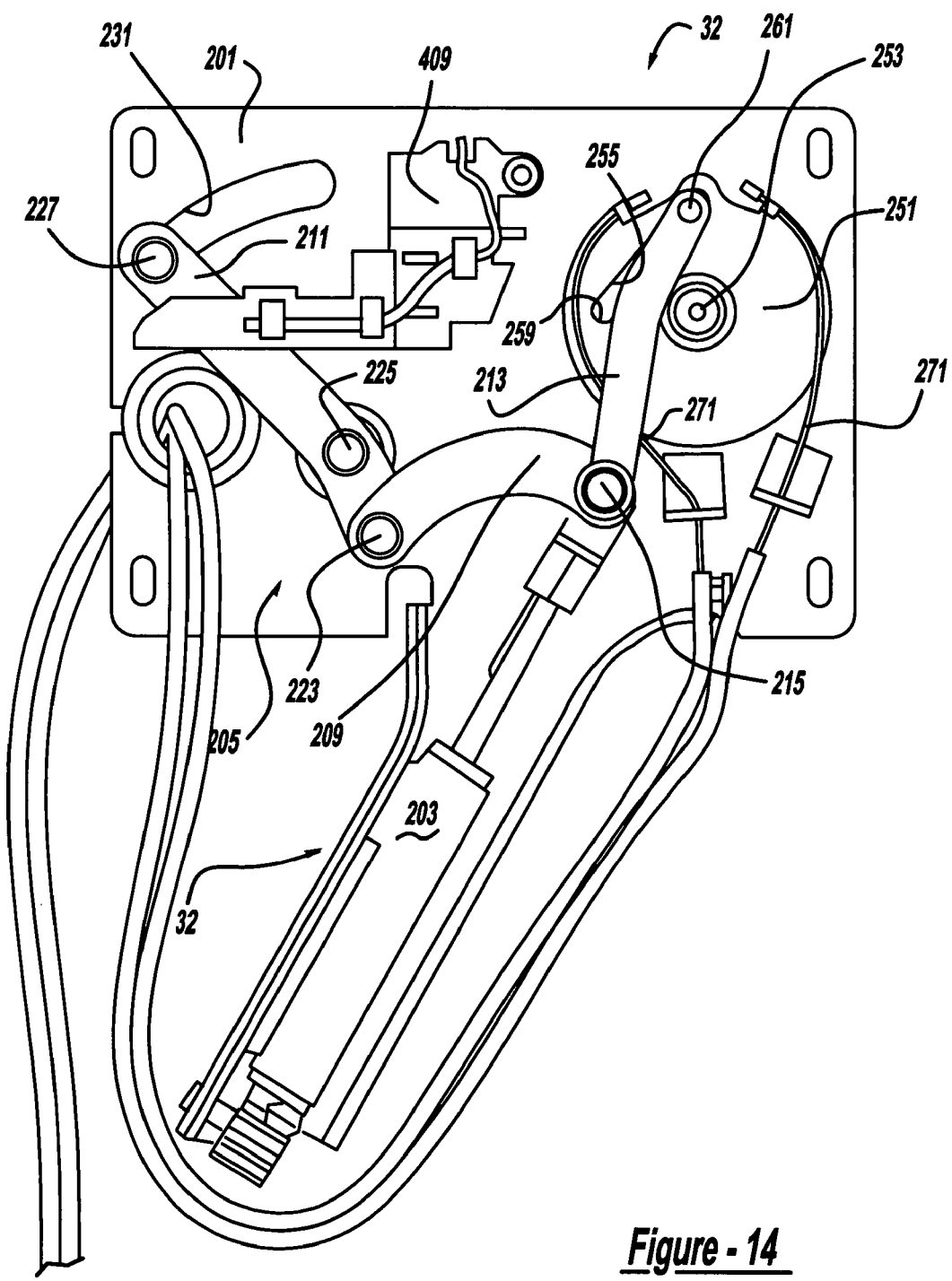
FIG. 14 is a side elevational view, opposite that of FIG. 11, showing the latch assembly employed in the preferred embodiment system, disposed in a latched position.

Referring to FIGS. 11–13, the preferred embodiment of latching system 32 includes a stamped steel plate 201, upon which is fixed a linearly extendable hydraulic actuator 203, a latching linkage assembly 205 and a lost motion device 207. Latching linkage assembly 205 includes an arcuately shaped first link 209, an elongated second link 211 and an offset angled third link 213. A first pivot 215 of arcuate link 209 is linearly slid within an elongated and diagonally oriented slot 221 disposed in plate 201 upon automatic actuation of actuator 203 which causes extension of a piston rod coupled to pivot 215. Second link 211 is rotatably coupled to arcuate link 209 at a floating pivot 223. Thus, automatic actuator-driven movement of arcuate link 209 causes the coupled link 211 to rotate about a fixed pivot 225 such that a follower pin 227 coupled to link 211 is linearly slid from an unlatched position shown in FIGS. 11 and 12 to a latched position as shown in FIG. 14. A catch or roller 229 is journaled about follower pin 227 and follower pin 227 is operably slid within an arcuate surface defining a slot 231 in plate 201. Roller 229 engages within a tapered bifurcated opening of a striker 241 downwardly and forwardly projecting from a lower surface of tonneau cover 29 (see FIGS. 7, 8 and 18), when tonneau cover 29 is in its fully closed and covering position as shown in FIG. 1 and when latch assembly 32 is in its fully latched position as shown in FIGS. 11 and 14. When a microprocessor based controller 407 (see FIG. 18) automatically causes retraction of the piston rod into the hydraulic cylinder of actuator 203, the links will reverse operation and cause roller 229 to rotate from its latching position to an unlatching position thereby releasing striker 241.

Figure 15:
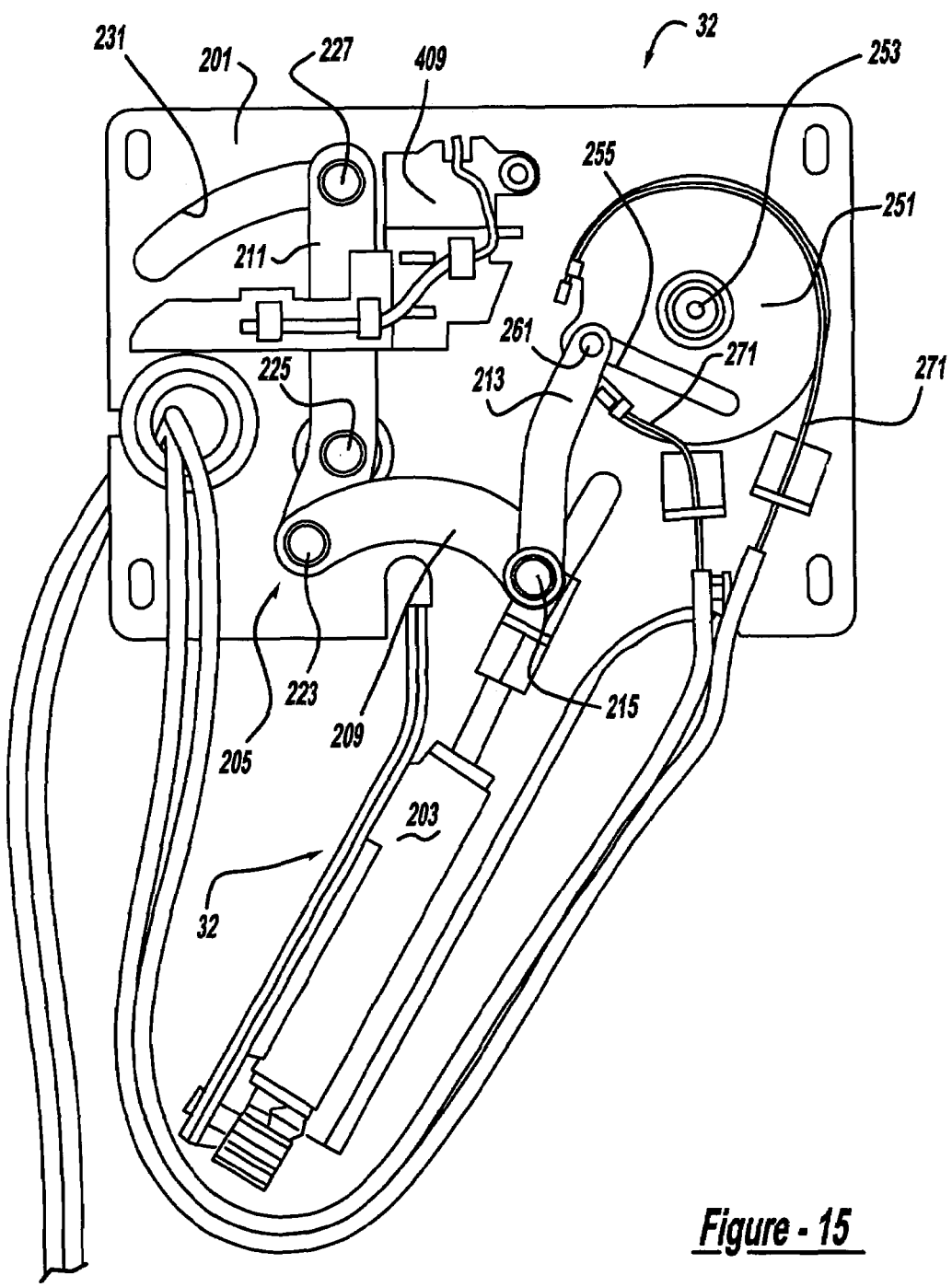
FIG. 15 is a side elevational view, opposite that of FIG. 11, showing the latch assembly employed in the preferred embodiment system, disposed in the manually overridden, unlatched position.
Figure 16:
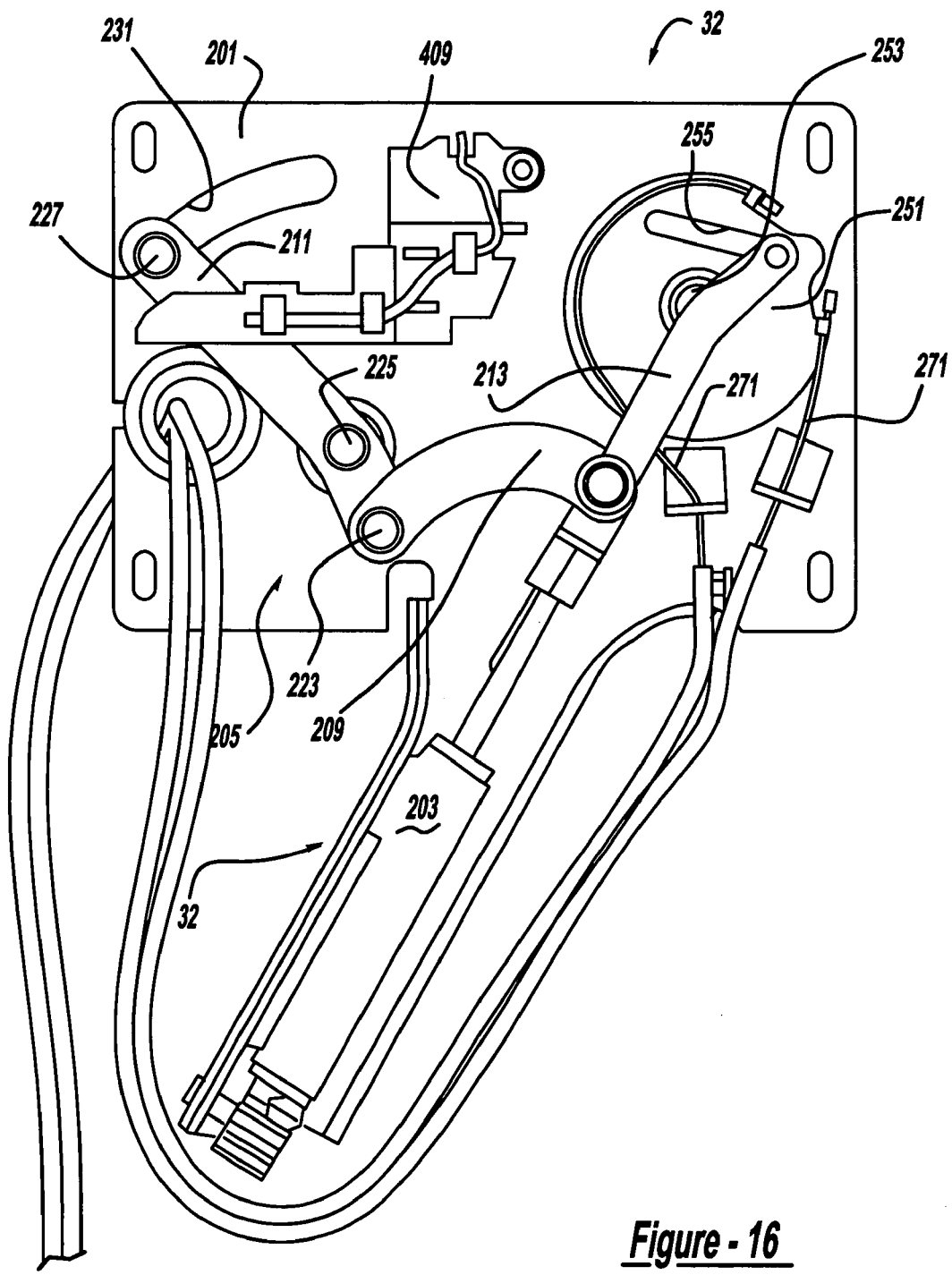
FIG. 16 is a side elevational view, opposite that of FIG. 11, showing the latch assembly employed in the preferred embodiment system, disposed in the manually overridden, latched position
Figure 20:
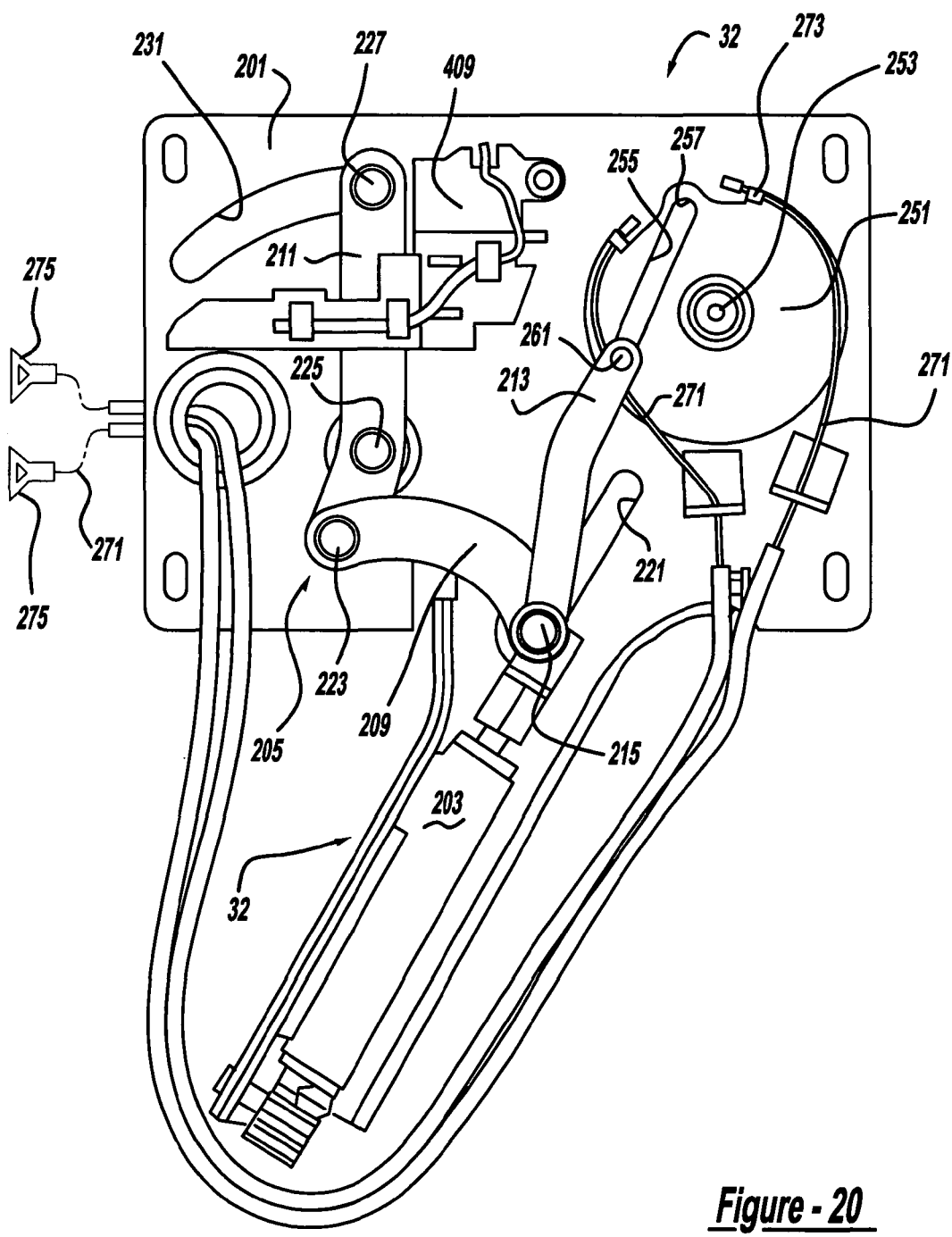
FIG. 20 is a side elevational view showing manual override handles of the latch assembly employed in the preferred embodiment.

A manual override feature is provided within latching system 32 to allow a vehicle operator to manually latch or unlatch roller 229 with striker 241 even when electrical or hydraulic power is not present, such as could happen during vehicle servicing or due to battery failure. Such an override feature is achieved through a metallic disk 251 of lost motion device 207 which is rotatable about a fixed pivot 253. An internal, straight, camming slot 255 is disposed within disk 251 and has a pair of abutting surfaces 257 and 259. A cam follower pin 261 projecting from link 213 is allowed to freely move in a lost-motion manner within slot 255 during normal automatic operation of latch assembly 32. Flexible and elongated cables 271 are attached to disk by spaced apart fasteners 273; operator accessible handles 275 (see FIG. 20) are located within the automotive vehicle and are attached to an opposite end of each cable 271 such that manual pulling of one handle causes manually actuated rotation of disk 251 in that direction while manual pulling of the other handle causes reverse rotation of disk 251. Thus, manually actuated rotation of disk 251 serves to back drive the linkages through contact of the respective abutting surface 259 against pin 261 of link 213; this causes link 213 then upwardly and rotatably pulls or pushes pivot 215 attached to arcuate link 209 for coincidentally driving link 211 and roller 229. The manually overridden unlatching position can be viewed in FIG. 15 while the manually overridden unlatching position can be observed in FIG. 16.

It is noteworthy that linkage assembly 32 is extremely thin in its cross-car package. Plate 201 is secured to a quarter inner panel of the vehicle body outboard of the roof storage compartment with all of the linkages and actuators disposed between the quarter inner panel and the outer quarter panel skin of the vehicle. Essentially, only roller 229, a portion of the hydraulic lines and a portion of the manual override cables/handles are exposed on the in-board side of plate 201 thereby reducing the accessibility of components which might otherwise interfere with retraction or extension of the convertible roofs.

Figure 18:
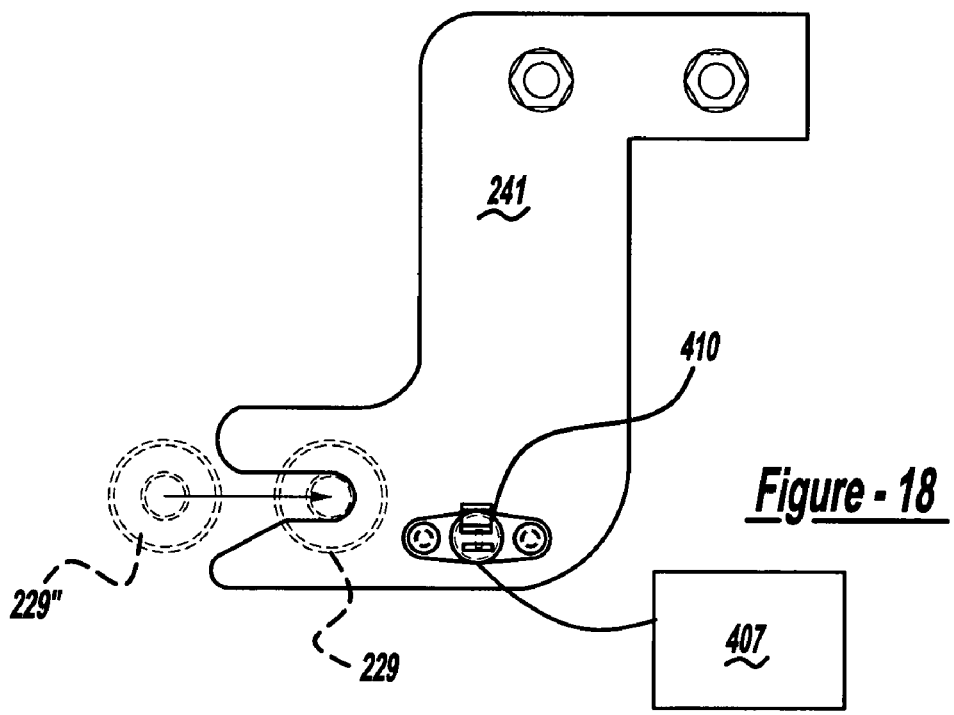
FIG. 18 is a diagrammatic view showing a second tonneau cover switching mechanism employed in the preferred embodiment system.

Reference should now be made to FIGS. 12 and 18 wherein a Hall effect magnet 410 is mounted on an outboard face of each striker 241. A Hall effect switch 409 is affixed to each plate 201 which operably senses the location of magnet 410; if magnet 410 is sensed as being in the tonneau striker closed position, then switch 409 sends a signal to microprocessor 407 which causes cylinder 203 to engage roller 229 with striker 241.

Figure 23:
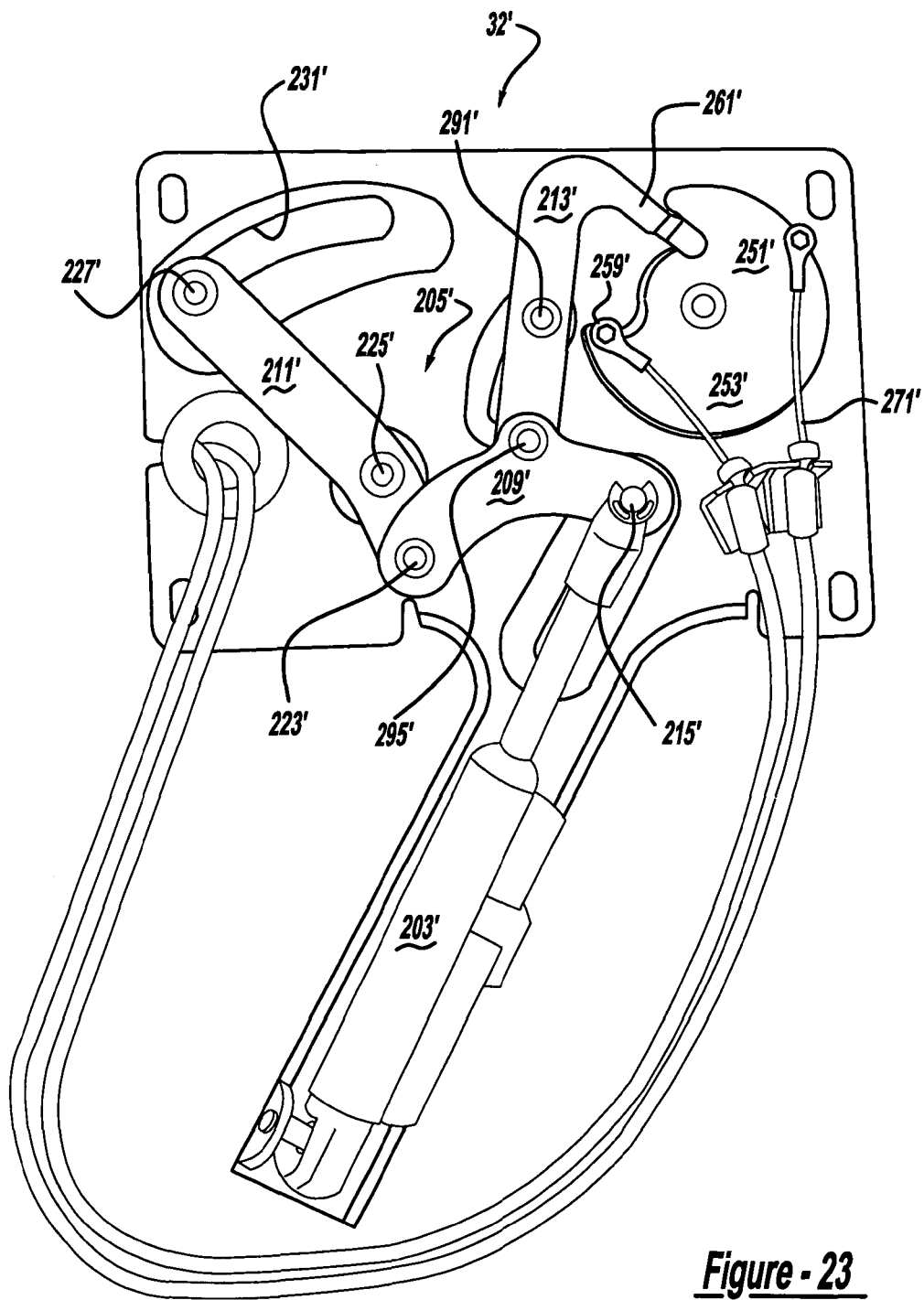
FIG. 23 is a side elevational view, like that of FIG. 14, showing the latch assembly employed in the alternate embodiment system, disposed in a latched position.
Figure 24:
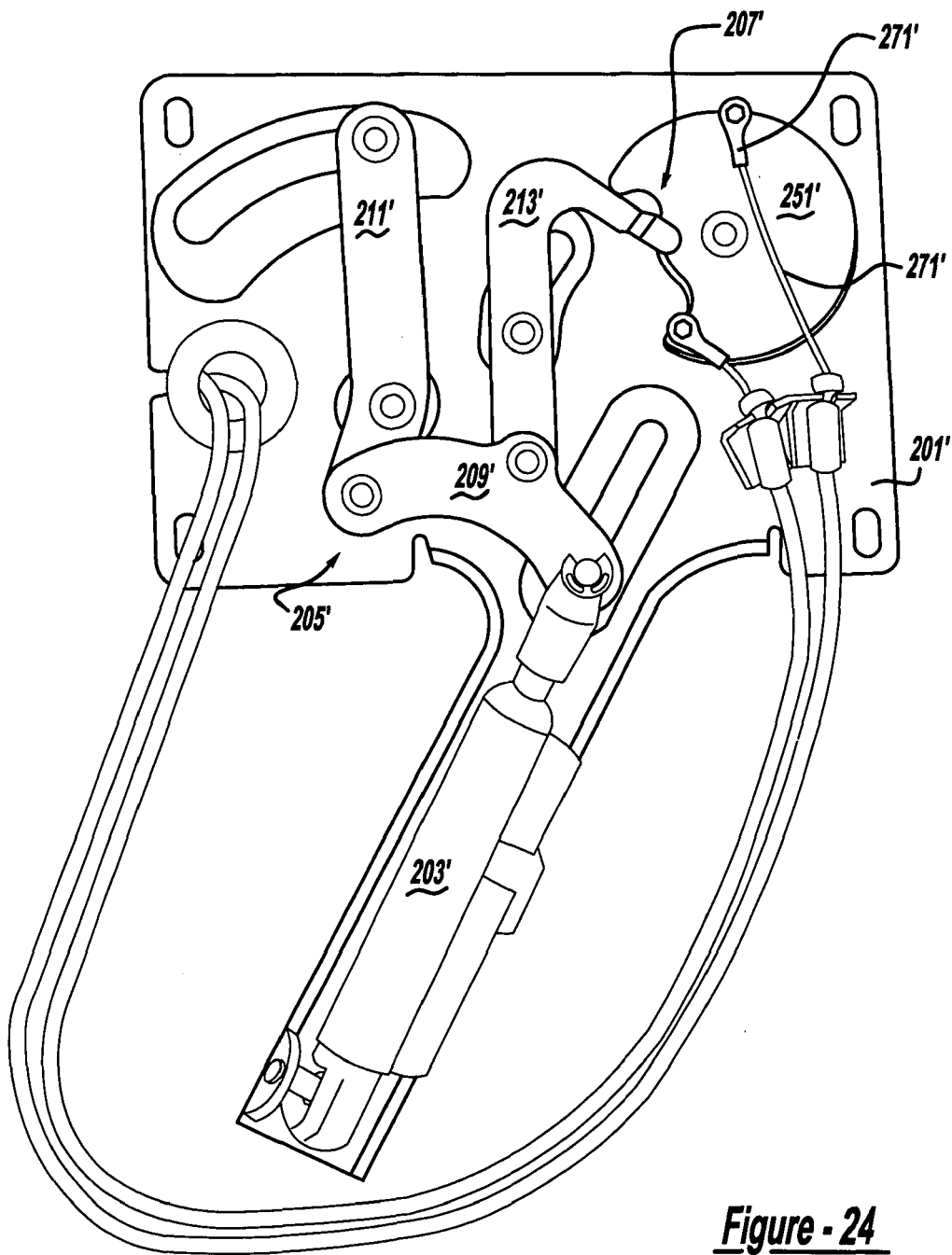
FIG. 24 is a side elevational view, like that of FIG. 15, showing the latch assembly employed in the alternate embodiment system, disposed in a manually overridden, unlatched position.
Figure 25:
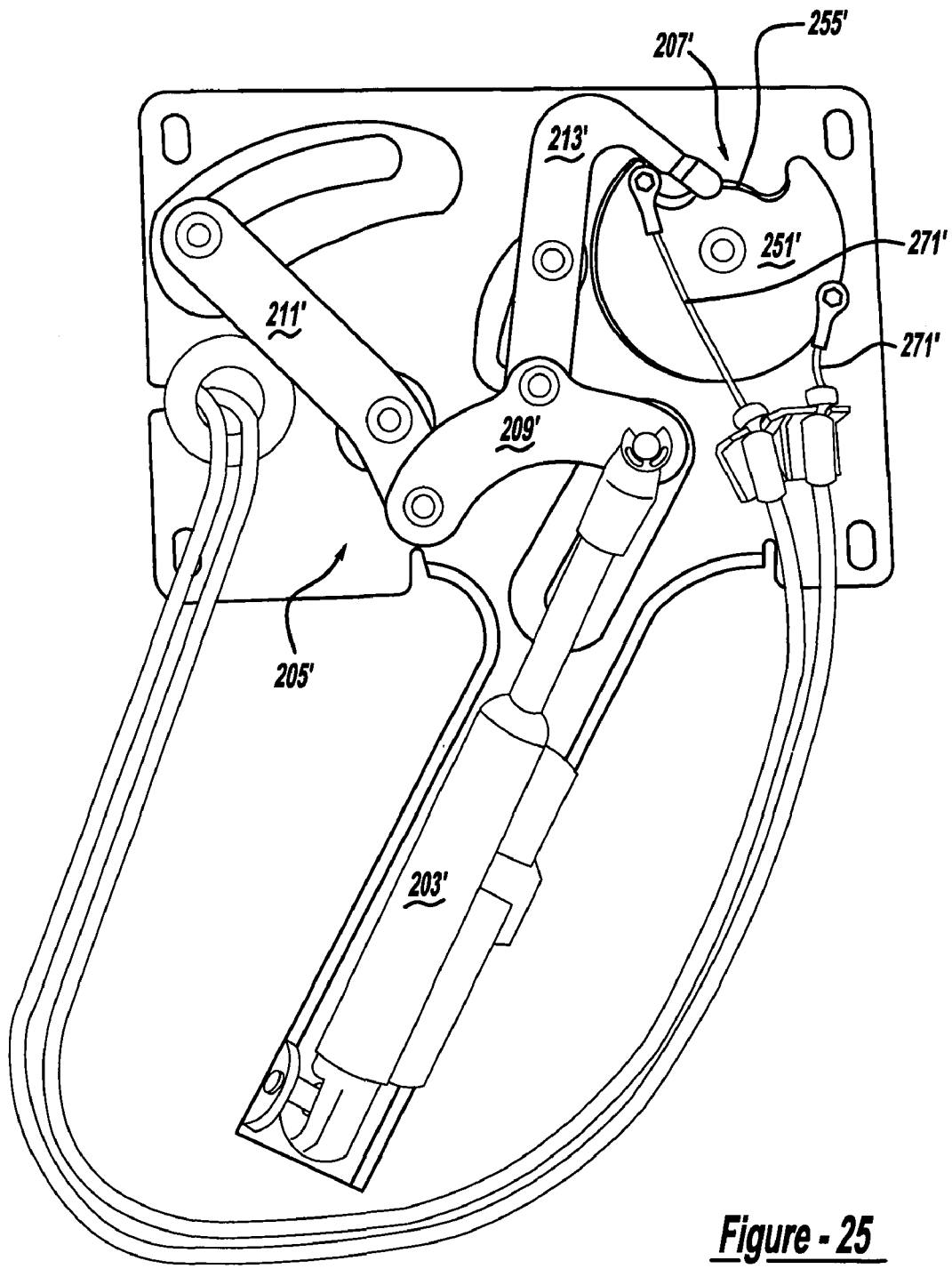
FIG. 25 is a side elevational view, like that of FIG. 16, showing the latch assembly employed in the alternate embodiment system, disposed in a manually overridden, latch position.

Referring to FIGS. 22–25, an alternate embodiment of a latching system 32' includes a stamped steel plate 201', upon which is fixed a linearly extendable hydraulic actuator 203', a latching linkage assembly 205' and a lost motion device 207'. Latching linkage assembly 205' includes an arcuately shaped first link 209', an elongated second link 211' and a hook-like third link 213'. A first pivot 215' of arcuate link 209' is linearly slid within an elongated and diagonally oriented slot 221' disposed in plate 201' upon automatic actuation of actuator 203' which causes extension of a piston rod coupled to pivot 215'. Second link 211' is rotatably coupled to arcuate link 209' at a floating pivot 223'. Thus, automatic actuator-driven movement of arcuate link 209' causes the coupled link 211' to rotate about a fixed pivot 225' such that a follower pin 227' coupled to link 211' is linearly slid from an unlatched position shown in FIG. 22 to a latched position as shown in FIG. 23. A roller 229' is journaled about follower pin 227' and follower pin 227' is operably slid within an arcuate surface defining a slot 231' in plate 201'. Roller 229' has a somewhat inwardly tapered, H cross sectional shape which operably engages within a tapered bifurcated opening of a striker 241 downwardly and forwardly projecting from a lower surface of tonneau cover 29 (see FIGS. 7, 8 and 18), when tonneau cover 29 is in its fully closed and covering position as shown in FIG. 1 and when latch assembly 32' is in its fully latched position as shown in FIG. 23. When a microprocessor based controller automatically causes retraction of the piston rod into the hydraulic cylinder of actuator 203', the links will reverse operation and cause roller 229' to rotate from its latching position to an unlatching position thereby releasing striker 241.

A manual override feature is provided within latching system 32' to allow a vehicle operator to manually latch or unlatch roller 229' with striker 241 even when electrical or hydraulic power is not present, such as could happen during vehicle servicing or due to battery failure. Such an override feature is achieved through a metallic disk 251' of lost motion device 207' which is rotatable about a fixed pivot 253'. A depressed camming slot 255' is disposed within disk 251' and has a pair of abutting surfaces 257' and 259'. A bent, cam following finger 261' of hook-like link 213' is allowed to freely move in a lost-motion manner within slot 255' during normal automatic operation of latch assembly 32'. Flexible and elongated cables 271' are attached to disk by spaced apart fasteners 273'; operator accessible handles 275 (see FIG. 20) are located within the automotive vehicle and are attached to an opposite end of each cable 271' such that manual pulling of one handle causes manually actuated rotation of disk 251' in that direction while manual pulling of the other handle causes reverse rotation of disk 251'. Thus, manually actuated rotation of disk 251' serves to back drive the linkages through contact of the respective abutting surface 259' against finger 261' of link 213'; this causes a follower pin 291' attached to link 213' to slide within a camming slot 293' such that link 213' then upwardly and rotatably pulls or pushes an intermediate pivot 295' attached to arcuate link 209' for coincidentally driving link 211' and roller 229'. The manually overridden unlatching position can be viewed in FIG. 24 while the manually overridden unlatching position can be observed in FIG. 25.

Figure 17:
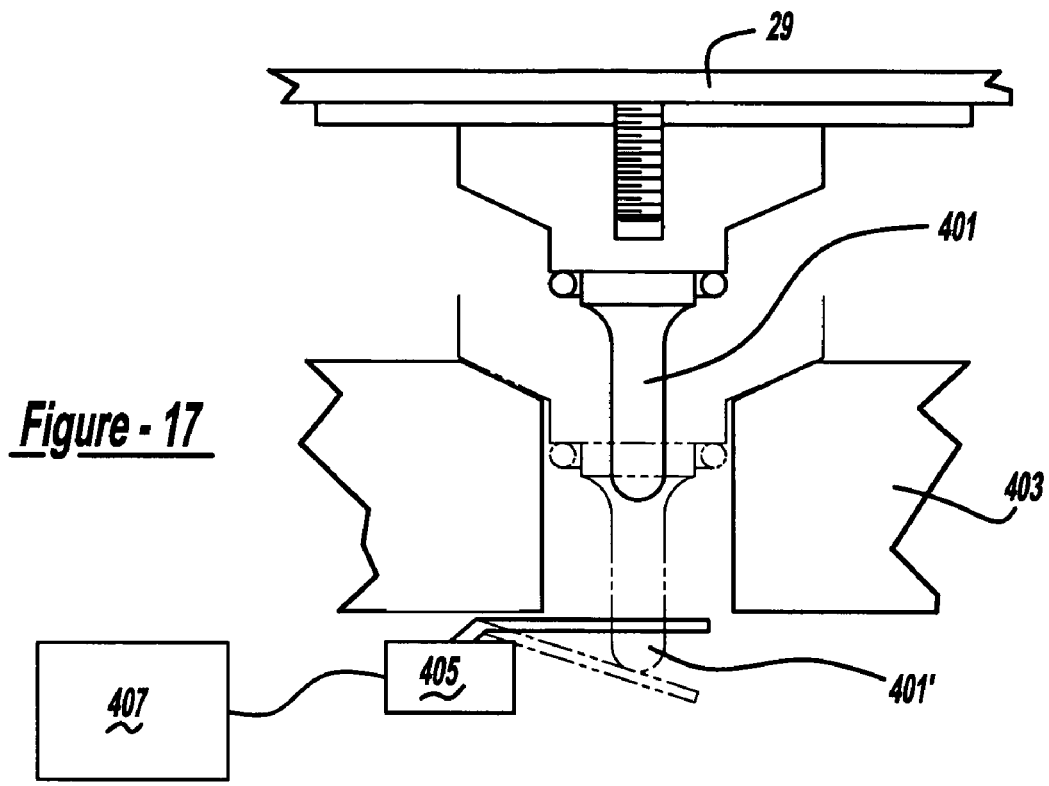
FIG. 17 is a diagrammatic view showing a first tonneau cover switching mechanism employed in an alternate embodiment system.

All of the top stack mechanism actuators and tonneau cover actuators may be controlled in accordance with the control system disclosed in U.S. Pat. No. 5,451,849 entitled "Motorized Self-Correcting Automatic Convertible Top" which issued to Porter et al. on Sep. 19, 1995, which is incorporated by reference herein, or through hall effect sensors coupled to a microprocessor controller. For example, in the alternate embodiment, FIG. 17 illustrates a locator pin 401 downwardly extending from a bracket attached to an underside of tonneau cover 29 (see FIGS. 7 and 8). When fully closed, locator pin 401 enters within a body-mounted receptacle 403 and pushes a tongue of a micro switch 405 coupled to a microprocessor-based controller 407. Such micro switch 405 actuation serves to then actuate a hydraulic pump which causes extension of hydraulic actuator 203 (see FIG. 12). Referring now to FIG. 18, when roller 229 is fully engaged within striker 241, roller depresses a tongue of a micro switch 409 which transmits a signal to controller 407 to cause deactivation of hydraulic actuator 203.

While various embodiments of the latching and convertible roof system have been disclosed, it should be appreciated that variations may be made to the present invention. For example, the presently disclosed latch can be used in other areas of the vehicle such as for the front header-to-one bow attachment or as a roof downstack latch, although certain advantages of the present invention may not be achieved. Furthermore, the present latch can be used to secure a hook or striker extending from a trunk lid which may be used to cover a retracted roof. Also, the hard-top roofs can be covered with vinyl, fabric or painted, or can include transparent glass panels. The present invention latch can alternately be used with a soft top roof. Moreover, electric motor actuators can be used in place of one or more of the disclosed hydraulic actuators. It should also be appreciated that the trunk compartment can be in front of the passenger compartment for a mid or rear engine vehicle. While certain materials and shapes have been disclosed, it should be appreciated that various other shapes and materials can be employed. It is intended by the following claims to cover these and any other departures from the disclosed embodiments which fall within the true spirit of this invention.

The invention claimed is:

1. A convertible roof system comprising:
   a front hard-top roof member movable from a closed position to an open position;
   a rear hard-top roof member movable from a closed position to an open position;
   a substantially rigid tonneau cover member movable to cover the roof members when the roof members are in their open positions;
   a latch having an automatic actuator and a manual override actuator, the manual override actuator being operable to mechanically move a portion of the latch, the latch operably securing at least one of the members;
   a stationary bracket remotely located from the tonneau cover member;
   a tonneau linkage mechanism operably moving the tonneau cover member;
   an automatic tonneau actuator coupled to and operably driving the tonneau linkage mechanism;
   an auxiliary closeout panel movably coupled to the tonneau cover member; and
   an elongated cable connecting the auxiliary closeout panel to the stationary bracket.

2. A convertible roof system comprising:
   a front hard-top roof member movable from a closed position to an open position;
   a rear hard-top roof member movable from a closed position to an open position;
   a substantially rigid tonneau cover member movable to cover the roof members when the roof members are in their open positions; and
   a latch having an automatic actuator and a manual override actuator, the latch operably securing at least one of the members;
   wherein the manual override actuator further comprises:
   (a) a lost motion coupling; and
   (b) at least one manually operable handle coupled to the lost motion coupling.

3. The system of claim 2 further comprising:
   a latching linkage assembly selectively engagable with the lost motion coupling;
   the automatic actuator operably driving the latching linkage assembly when in an energized automatic mode of operation;
   a catch movably coupled to the latching linkage assembly; and
   at least one cable connecting the handle to the lost motion coupling, the handle being remotely displaced from the lost motion coupling and the catch.

4. A convertible roof system comprising:
   a front hard-top roof member movable from a closed position to an open position;
   a rear hard-top roof member movable from a closed position to an open position;
   a substantially rigid tonneau cover member movable to cover the roof members when the roof members are in their open positions; and
   a latch having an automatic actuator and a manual override actuator, the latch operably securing at least one of the members;
   a stationary vehicle body having a convertible roof storage compartment operably receiving at least one of the roof members when the roof members are in the open positions;
   the latch further including a latching linkage assembly, operably driven by the automatic actuator, and a movable catch coupled to the latching linkage assembly;
   the automatic actuator and latching linkage assembly being located outboard of the roof storage compartment; and
   the catch being located within the roof storage compartment.

5. The system of claim 4 further comprising a striker projecting from the tonneau cover member, the catch operably disengaging from the striker in response to movement of either the automatic actuator or a manual override actuator.

6. The system of claim 1 further comprising a magnetic sensor operably indicating a position of the tonneau cover member and the sensor operably sending a signal which causes a changed condition of the automatic actuator.

7. The system of claim 1 wherein the roof members are stored in a nested and substantially vertical orientation below the tonneau cover member when the roof members are located in their open positions and the tonneau cover member is located in a closed position.

8. A convertible roof system comprising:
   a front hard-top roof member movable from a closed position to an open position;

a rear hard-top roof member movable from a closed position to an open position;
a substantially rigid tonneau cover member movable to cover the roof members when the roof members are in their open positions; and
a latch having an automatic actuator and a manual override actuator, the latch operably securing at least one of the members;
a linkage assembly coupled to the tonneau cover member, the linkage assembly including at least an arcuate gooseneck link; and
an automatic tonneau actuator operably driving the linkage assembly;
the linkage assembly operably pivoting the tonneau cover member between a closed and substantially horizontal position, and an open and substantially vertical position.

9. The system of claim 2, wherein the latch further comprises:
a plate;
the automatic actuator mounted to the plate;
a first link pivotably coupled to the automatic actuator;
a second link pivotably coupled to the first link;
a third link coupled to the first link and being spaced from the second link; and
a catch coupled to the second link, the second link operably moving the catch from a first position to a second position, the catch being located on an opposite face of the plate from the first and second links.

10. The system of claim 9 wherein the lost-motion coupling is movably coupled to the plate and selectively engages at least one of the links.

11. The system of claim 10 wherein the lost-motion coupling selectively engages with an end portion of the third link.

12. The system of claim 2 wherein the manually operable handle is coupled to the lost motion coupling by at least one elongated member, the handle operably rotating the lost-motion coupling in order to manually move links and a catch of the latch.

13. The system of claim 2 wherein the latch further comprises a rotary member having a camming surface, a cam follower projecting from a link operably engaging the camming surface.

14. The system of claim 2 wherein the latch further comprises a member-engaging roller member and the automatic actuator being fluid-powered.

15. The system of claim 9 further comprising:
an arcuate slot located within the plate;
the catch being a roller;
a pin extending through the slot and coupling the roller to an end of the second link; and
a fixed pivot rotatably coupling the second link to the plate substantially between the first link and the pin.

16. The system of claim 2 further comprising an electrical switch operably transmitting a signal indicative of a position of a convertible roof compartment cover which causes the automatic actuator to move a portion of the latch.

17. The system of claim 9 wherein the third link is hook-shaped and has a central pivot, and the third link is pivotally coupled to the first link.

18. A convertible roof system comprising:
a substantially rigid member movable from a closed position to an open position, the substantially rigid member being at least one of:
(a) a hard-top roof member movable from a closed position to an open position; and
(b) a movable tonneau cover member;
a latch comprising an automatic actuators, a manual override actuator and a lost motion coupling, the latch operably securing at least one of the members; and
at least one manually operable handle operable to mechanically move the manual override actuator, the manually operable handle being coupled to the lost motion coupling.

19. The system of claim 18 wherein the hard-top roof member is a rearmost roof panel, the system further comprising:
a second hard-top roof panel movable between a closed position and an open position by a linkage mechanism, the roof panels being located below a substantially horizontal plane defined by the tonneau cover member when the tonneau cover member is closed, the roof panels being located forward of an externally accessible storage compartment when in their open positions.

20. The system of claim 18 wherein the member secured by the latch is the tonneau cover member, and the tonneau cover member is automatically movable.

21. A convertible roof system comprising:
a convertible roof member movable from a raised position above a vehicle beltline to a stowed position substantially below a vehicle beltline;
a movable covering member operably covering at least a portion of the roof member when the roof member is in its stowed position;
a latch including an automatic actuator and a manual override actuator, the latch operable attaching to at least one of the members; and
a lost motion coupling connected at least one of the actuators.

22. The system of claim 21 wherein the latch operably secures the covering member.

23. The system of claim 22 wherein the covering member is a rigid tonneau cover covering a dedicated roof storage compartment located forward of a miscellaneous storage compartment.

24. The system of claim 21 wherein the manual override actuator further comprises:
at least one manually operable handle coupled to the lost motion coupling.

25. The system of claim 24 further comprising:
a latching linkage assembly selectively engagable with the lost motion coupling;
the automatic actuator operably driving the latching linkage assembly when in an energized automatic mode of operation;
a catch movably coupled to the latching linkage assembly; and
at least one cable connecting the handle to the lost motion coupling, the handle being remotely displaced from the lost motion coupling and the catch.

26. The system of claim 21 wherein the convertible roof member is a hard-top roof panel.

27. A convertible roof system comprising:
a convertible roof member movable from a raised position above a vehicle beltline to a stowed position substantially below a vehicle beltline;
a movable covering member operably covering at least a portion of the roof member when the roof member is in its stowed position; and
a latch including an automatic actuator and a manual override actuator, the latch operably attaching to at least one of the members;

wherein the latch further comprises:
(a) a rotary member having a camming surface;
(b) multiple links operably moving in response to actuation of the actuators;
(c) a cam follower coupling at least one of the links to the camming surface; and
(d) a catch moved from a member engaging position to a member disengaging position in response to movement of at least one of the links.

28. The system of claim 21 wherein the latch is mounted to a vehicle side and a member engaging catch of the latch moves along a substantially fore-and-aft oriented plane.

29. The system of claim 27 wherein the convertible roof member is a hard-top exterior roof panel located forward of an externally accessible storage compartment when in its stowed position.

30. The system of claim 27 wherein the manual override actuator further comprises:
a lost motion coupling; and
at least one manually operable handle coupled to the lost motion coupling.

31. The system of claim 8 further comprising a magnetic sensor operably indicating a position of the tonneau cover member and the sensor operably sending a signal which causes a changed condition of at least one of the automatic actuators.

32. The system of claim 8 further comprising a striker projecting from the tonneau cover member, the latch operably disengaging from the striker in response to movement of either: (a) at least one of the automatic actuators: or (b) a manual override actuator.

33. The system of claim wherein the roof members are stored in a nested and substantially vertical orientation below the tonneau cover member when the roof members are located in their open positions and the tonneau cover member is located in a closed position.

* * * * *

UNITED STATES PATENT AND TRADEMARK OFFICE
CERTIFICATE OF CORRECTION

PATENT NO. : 7,140,666 B2 Page 1 of 1
APPLICATION NO. : 10/638948
DATED : November 28, 2006
INVENTOR(S) : Markus Wulf et al.

It is certified that error appears in the above-identified patent and that said Letters Patent is hereby corrected as shown below:

TITLE PAGE, No. (54), Title, "AUTOMOBILE" should be --AUTOMOTIVE--.

Column 1, line 1, "AUTOMOBILE" should be --AUTOMOTIVE--.

Column 10, line 2, Claim 18, "actuators" should be --actuator--.

Column 10, line 31, Claim 21, "operable" should be --operably--.

Column 12, line 13, Claim 33, "claim" should be --claim 9--.

Signed and Sealed this

Twenty-sixth Day of May, 2009

JOHN DOLL
*Acting Director of the United States Patent and Trademark Office*